(12) United States Patent
Saka et al.

(10) Patent No.: US 7,719,731 B2
(45) Date of Patent: May 18, 2010

(54) IMAGE READING APPARATUS CORRECTING NOISE IN IMAGE DATA

(75) Inventors: Masaaki Saka, Toyokawa (JP); Kazuhiro Ishiguro, Toyohashi (JP); Takayuki Nabeshima, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1022 days.

(21) Appl. No.: 11/020,209

(22) Filed: Dec. 27, 2004

(65) Prior Publication Data

US 2006/0066920 A1 Mar. 30, 2006

(30) Foreign Application Priority Data

Sep. 30, 2004 (JP) ............................. 2004-286212

(51) Int. Cl.
H04N 1/46 (2006.01)
(52) U.S. Cl. ...................................... 358/514; 358/530
(58) Field of Classification Search ................ 358/463; 382/275, 261; 348/246

See application file for complete search history.

(56) References Cited

U.S. PATENT DOCUMENTS

| | | | |
|---|---|---|---|
| 4,980,760 A | 12/1990 | Hiratsuka et al. | |
| 5,317,420 A | 5/1994 | Kuwahara | |
| 5,850,293 A | 12/1998 | Suzuki et al. | |
| 5,982,946 A * | 11/1999 | Murakami | 382/272 |
| 6,125,213 A * | 9/2000 | Morimoto | 382/263 |
| 6,215,512 B1 | 4/2001 | Imaizumi et al. | |
| 6,323,959 B1 | 11/2001 | Toyama et al. | |
| 6,441,915 B1 | 8/2002 | Imaizumi et al. | |
| 6,625,331 B1 | 9/2003 | Imaizumi et al. | |
| 6,631,207 B2 | 10/2003 | Hirota et al. | |
| 6,728,418 B1 * | 4/2004 | Kumagai et al. | 382/275 |
| 6,778,297 B1 | 8/2004 | Fujiwara | |
| 6,806,902 B1 * | 10/2004 | Donovan | 348/246 |
| 7,046,861 B2 | 5/2006 | Imaizumi et al. | |

(Continued)

FOREIGN PATENT DOCUMENTS

EP 0270090 9/1993

(Continued)

OTHER PUBLICATIONS

U.S. Appl. No. 11/012,184, filed Dec. 16, 2004, Ishiguro et al.

(Continued)

Primary Examiner—Douglas Q Tran
(74) Attorney, Agent, or Firm—Morrison & Foerster LLP

(57) ABSTRACT

An image reading apparatus includes, with the purpose of accurately correcting noise in an image due to dust on a platen, three line sensors spaced from each other in a sub scanning direction to scan an original in the sub scanning direction, a platen between the original and the three line sensors, a moving mechanism for moving the platen, a noise detection processor detecting a noise pixel from each of multiple data output from the three line sensors, a second pixel extractor extracting a second pixel present in first data for correcting the noise pixel, based on a value of a first pixel present in second data different from the first data and corresponding to the same location on the original as the noise pixel, and a corrector correcting the noise pixel based on the extracted second pixel.

20 Claims, 20 Drawing Sheets

U.S. PATENT DOCUMENTS

| | | | |
|---|---|---|---|
| 7,072,075 B2 * | 7/2006 | Kondo et al. | 358/1.9 |
| 7,079,685 B1 | 7/2006 | Hirota et al. | |
| 7,283,164 B2 * | 10/2007 | Kakarala et al. | 348/246 |
| 7,382,406 B2 * | 6/2008 | Higuchi | 348/241 |
| 2001/0026380 A1 * | 10/2001 | Imoto | 358/496 |
| 2002/0136463 A1 | 9/2002 | Akahori et al. | |
| 2006/0066915 A1 | 3/2006 | Saka et al. | |
| 2006/0066916 A1 | 3/2006 | Ishiguro et al. | |
| 2006/0066917 A1 | 3/2006 | Ishiguro et al. | |
| 2006/0066918 A1 | 3/2006 | Ishiguro et al. | |
| 2006/0066919 A1 | 3/2006 | Saka et al. | |
| 2006/0066921 A1 | 3/2006 | Saka et al. | |
| 2006/0072169 A1 | 4/2006 | Ishiguro et al. | |
| 2006/0072826 A1 | 4/2006 | Ishiguro et al. | |
| 2006/0098248 A1 | 5/2006 | Suzuki et al. | |

FOREIGN PATENT DOCUMENTS

| | | |
|---|---|---|
| JP | 63-141455 | 6/1988 |
| JP | 1-309467 | 12/1989 |
| JP | 05-324812 | 12/1993 |
| JP | 9-139844 | 5/1997 |
| JP | 10-069007 * | 3/1998 |
| JP | 2000-278485 | 10/2000 |
| JP | 2000-287031 A | 10/2000 |
| JP | 2000-324312 | 11/2000 |
| JP | 2001-272829 | 10/2001 |
| JP | 2002-77584 | 3/2002 |
| JP | 2002-185767 | 6/2002 |
| JP | 2002-271631 | 9/2002 |
| JP | 2002-354262 | 12/2002 |
| JP | 2003-8846 | 1/2003 |
| JP | 2003-259096 | 9/2003 |
| JP | 2003-315933 | 11/2003 |
| JP | 2004-112611 | 4/2004 |
| JP | 2004-112645 | 4/2004 |

OTHER PUBLICATIONS

U.S. Appl. No. 11/012,231, filed Dec. 16, 2004, Ishiguro et al.
U.S. Appl. No. 11/017,662, filed Dec. 22, 2004, Ishiguro et al.
U.S. Appl. No. 11/019,520, filed Dec. 23, 2004, Ishiguro et al.
U.S. Appl. No. 11/019,181, filed Dec. 23, 2004, Ishiguro et al.
U.S. Appl. No. 11/019,712, filed Dec. 23, 2004, Saka et al.
U.S. Appl. No. 11/020,232, filed Dec. 27, 2004, Suzuki et al.
U.S. Appl. No. 11/020,233, filed Dec. 27, 2004, Saka et al.
U.S. Appl. No. 11/020,479, filed Dec. 27, 2004, Saka et al.
Japanese Office Action mailed on Oct. 28, 2008 directed towards foreign application No. 2004-286214; 4 pages.
Japanese Notice of Grounds of Rejection, mailed on Feb. 10, 2009, directed to Japanese Patent Application No. 2004-326869; 4 pages.
Ishiguro et al., U.S. Office Action, mailed Sep. 18, 2008, directed to U.S. Appl. No. 11/012,184; 26 pages.
Ishiguro et al., U.S. Office Action, mailed Apr. 10, 2009, directed to U.S. Appl. No. 11/012,184; 15 pages.
Ishiguro et al., U.S. Office Action, mailed May 12, 2008, directed to U.S. Appl. No. 11/012,231; 37 pages.
Ishiguro et al., U.S. Office Action, mailed Nov. 20, 2008, directed to U.S. Appl. No. 11/012,231; 31 pages.
Ishiguro et al., U.S. Office Action, mailed Oct. 25, 2007, directed to U.S. Appl. No. 11/019,520; 11 pages.
Ishiguro et al., U.S. Office Action, mailed Sep. 12, 2008, directed to U.S. Appl. No. 11/017,662; 31 pages.
Ishiguro et al., U.S. Office Action, mailed Apr. 24, 2009, directed to U.S. Appl. No. 11/017,662; 27 pages.
Ishiguro et al., U.S. Office Action, mailed Sep. 23, 2008, directed to U.S. Appl. No. 11/019,181; 26 pages.
Ishiguro et al., U.S. Office Action, mailed Apr. 13, 2009, directed to U.S. Appl. No. 11/019,181; 16 pages.
Saka et al., U.S. Office Action, mailed May 22, 2008, directed to U.S. Appl. No. 11/019,712; 34 pages.
Saka et al., U.S. Office Action, mailed Nov. 10, 2008, directed to U.S. Appl. No. 11/019,712; 40 pages.
Saka et al., U.S. Office Action, mailed Apr. 22, 2009, directed to U.S. Appl. No. 11/019,712; 29 pages.
Suzuki et al., U.S. Office Action, mailed May 23, 2008, directed to U.S. Appl. No. 11/020,232; 24 pages.
Suzuki et al., U.S. Office Action, mailed Nov. 13, 2008, directed to U.S. Appl. No. 11/020,232; 25 pages.
Suzuki et al., U.S. Office Action, mailed May 18, 2009, directed to U.S. Appl. No. 11/020,232; 25 pages.
Saka et al., U.S. Office Action, mailed Jul. 2, 2008, directed to U.S. Appl. No. 11/020,479; 37 pages.
Saka et al., U.S. Office Action, mailed Jan. 22, 2009, directed to U.S. Appl. No. 11/020,479; 32 pages.
Saka et al., U.S. Office Action, mailed May 14, 2009, directed to U.S. Appl. No. 11/020,479; 35 pages.
Ishiguro et al., U.S. Office Action, mailed Jun. 26, 2009, directed to U.S. Appl. No. 11/012,231; 8 pages.
Saka et al., U.S. Office Action, mailed Jan. 26, 2010, directed to U.S. Appl. No. 11/020,479; 4 pages.
Suzuki et al., U.S. Office Action, mailed Feb. 2, 2010, directed to U.S. Appl. No. 11/020,232; 4 pages.

* cited by examiner

F I G. 1
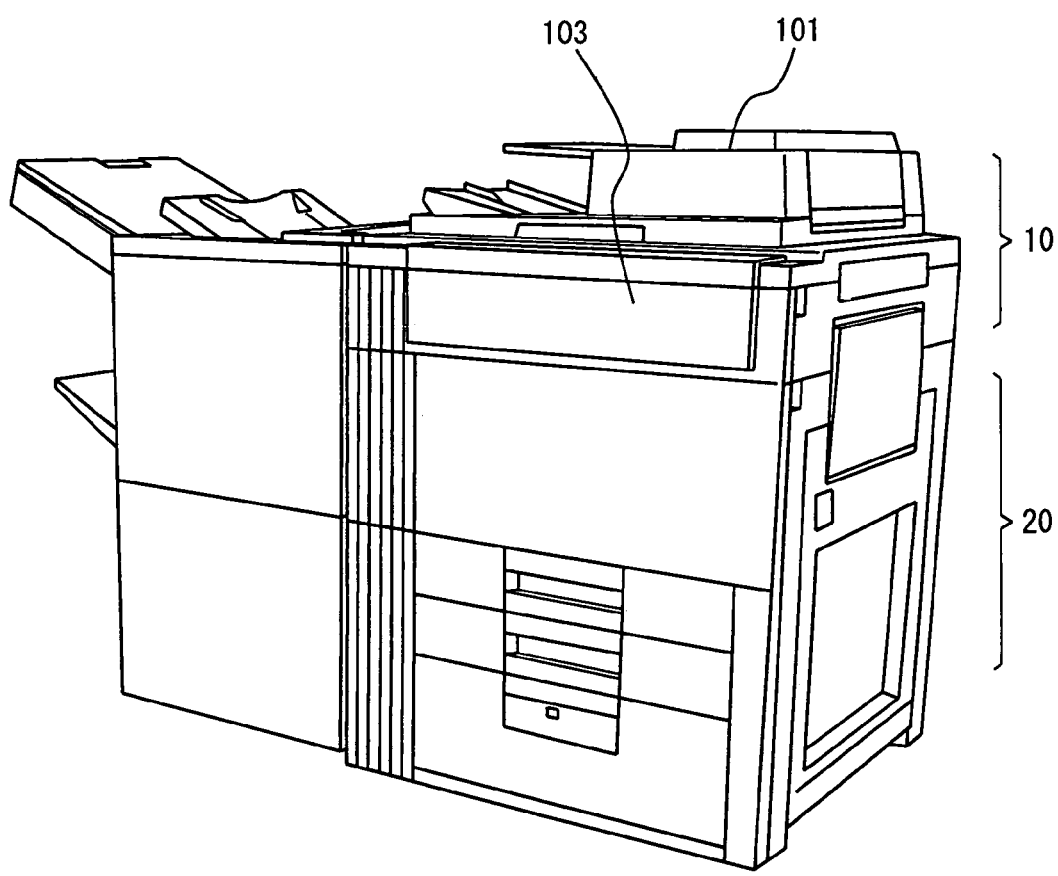

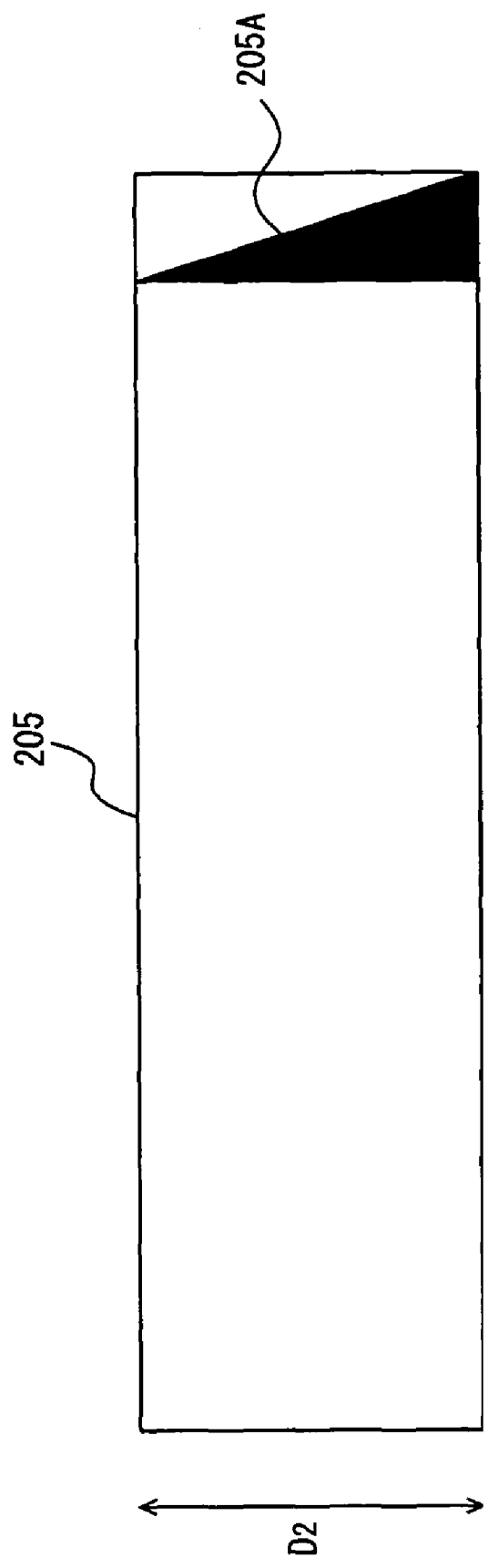

FIG. 10A
FIG. 10B
| C | C | C |
|---|---|---|
| C | A | C |
| C | C | C |
FIG. 10C
FIG. 10D
| C | C | C | C | C |
|---|---|---|---|---|
| C | B | B | B | C |
| C | B | A | B | C |
| C | B | B | B | C |
| C | C | C | C | C |
FIG. 10E
FIG. 10F
| C | C | C | C | C | C | C |
|---|---|---|---|---|---|---|
| C | B | B | B | B | B | C |
| C | B | B | B | B | B | C |
| C | B | B | A | B | B | C |
| C | B | B | B | B | B | C |
| C | B | B | B | B | B | C |
| C | C | C | C | C | C | C |

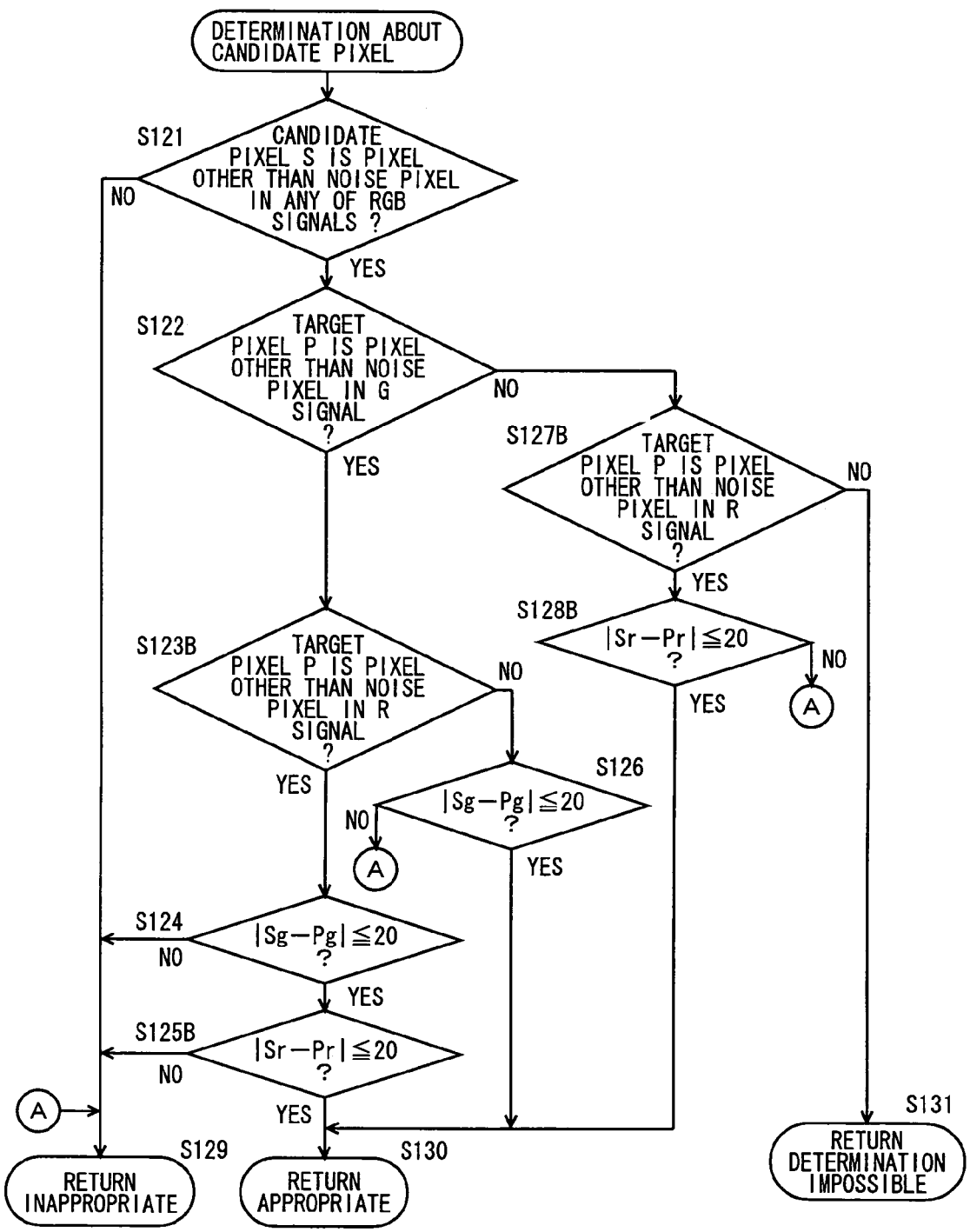

IMAGE READING APPARATUS CORRECTING NOISE IN IMAGE DATA

This application is based on Japanese Patent Application No. 2004-286212 filed with the Japan Patent Office on Sep. 30, 2004, the entire content of which is hereby incorporated by reference.

BACKGROUND OF THE INVENTION

1. Field of the Invention

The present invention relates generally to image reading apparatuses and particularly to image reading apparatuses reading an original while transporting it.

2. Description of the Related Art

Conventionally digital copiers and similar image reading apparatuses employ a technique referred to as so-called "reading an original while passing the original." More specifically, an original is transported relative to a fixed line sensor in a sub scanning direction orthogonal to the line sensor as the original is read.

Such image reading apparatus is provided with a transparent platen between the original and the line sensor to fix a position at which a transported original is read. The original reflects light which is in turn received via the platen by the line sensor.

As such, if dust, paper particles, flaws or other similar foreign matters (hereinafter generally referred to as "dust") adhere on the platen's reading position, the line sensor will read the dust while reading a transported original. This provides an output image with noise in the form of a line in the sub scanning direction.

Japanese Laid-Open Patent Publication No. 2002-77584 discloses a technique for improving the image quality by replacing image data of a region where noise in the form of a line appears in the sub scanning direction with image data of regions adjacent to and located on respective sides of the region having the line noise.

However, the image data of the adjacent regions on respective sides of the noise region is not always similar to the image data of the noise region. For example, in the adjacent regions, an edge region could be present or the color could suddenly change. More specifically, it is supposed here that an original has two regions that are one region of red and the other region of black and a noise region is present in the red region near the boundary between the two regions. In this case, although the noise region should be corrected to red, the noise region could be corrected to black due to the presence of the adjacent black region.

SUMMARY OF THE INVENTION

The present invention has been made to overcome the above disadvantage and contemplates an image reading apparatus capable of accurately correcting noise generated in an image by dust existing on a platen.

To achieve the above object the present invention in one aspect provides an image reading apparatus including: a plurality of line sensors arranged to be mutually spaced in a sub scanning direction to scan an original in the sub scanning direction; a platen arranged between the original and the line sensors; a mover moving the platen at a rate relative to the line sensors, the rate being different from that of the original relative to the line sensors; an extractor extracting a feature pixel having a predetermined feature from each of a plurality of data output from the line sensors; a detector comparing pixels of the plurality of data corresponding to a single location on the original to detect the feature pixel extracted from first data of the plurality of data, as a noise pixel if the feature pixel is not a feature pixel for the plurality of data other than the first data; a second pixel extractor extracting, based on a value of a first pixel present in second data different from the first data and corresponding to the same location on the original as the noise pixel, a second pixel present in the first data for correcting the noise pixel; and a corrector correcting the noise pixel based on the extracted second pixel.

In accordance with the present invention the original is scanned in the sub scanning direction by a plurality of line sensors spaced in the sub scanning direction and between the original and the line sensors there is provided the platen moving at a rate relative to the line sensors, the rate being different from that of the original relative to the line sensors. When the platen has dust adhering thereon, the dust is read by the line sensors sequentially. As the platen is moved at a rate relative to the line sensors, the rate being different from that of the original relative to the line sensors, the dust on the platen is read by each line sensor at a different location of the original. The image reading apparatus detects a noise pixel from each of a plurality of data output from the line sensors, compares pixels of the plurality of data corresponding to a single location on the original to detect the feature pixel extracted from first data among the plurality of data, as a noise pixel if the feature pixel is not a feature pixel for the plurality of data other than the first data, and determines a second pixel used for correcting the noise pixel based on a first pixel present in second data different from the first data in which the noise pixel is present. The noise generated by reading dust is corrected using a pixel selected from neighboring pixels. The image reading apparatus capable of improving image quality after correction can thus be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view of an MFP including an image reading apparatus in one embodiment of the present invention.

FIG. 5 is a rear plan view of the platen.

FIGS. 10A-10F show an edge extraction filter by way of example.

FIG. 20 is a flowchart showing a flow of a determination process for a candidate pixel in step S103 of FIG. 19.

DESCRIPTION OF THE PREFERRED EMBODIMENTS

Figure 2:
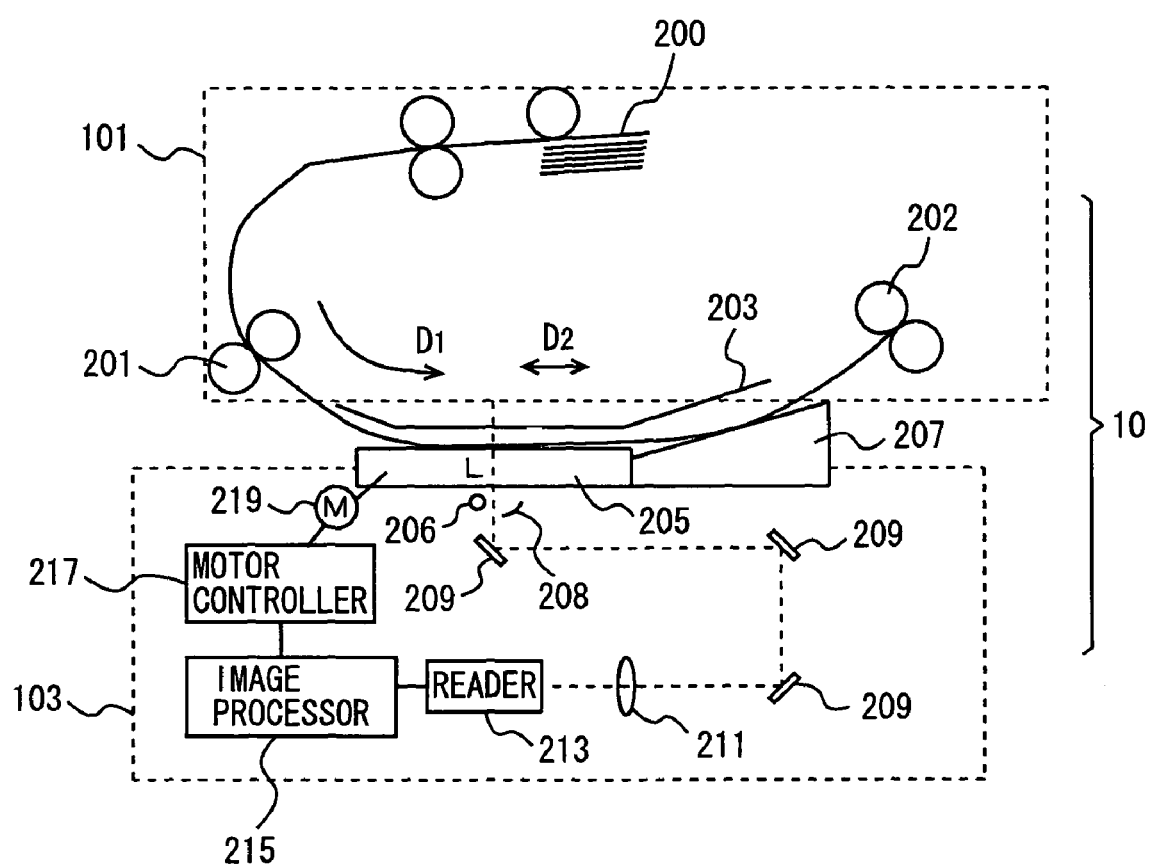
FIG. 2 schematically shows the image reading apparatus's internal structure.

Hereinafter reference will be made to the drawings to describe embodiments of the present invention. In the following description, like components are denoted by like reference characters and also identical in name and function.

FIG. 1 is a perspective view of a multi-function peripheral (MFP) including an image reading apparatus in one embodiment of the present invention. With reference to the figure, the MFP includes an image reading apparatus 10 operative to read an original image, and an image forming apparatus 20 provided under image reading apparatus 10. The MFP forms an image read by image reading apparatus 10 on a sheet of paper or similar recording medium. Furthermore, the MFP includes a communications interface to connect with a facsimile device, a local area network (LAN), a public line or similar network.

FIG. 2 schematically shows an internal configuration of image reading apparatus 10. Image reading apparatus 10 includes an automatic document feeder (ADF) 101 and a main body 103. ADF 101 includes an upper restraint plate 203 guiding a transported original in the vicinity of an original reading position, a timing roller pair 201 transporting the original to the original reading position, and a roller pair 202 transporting the original having moved past the reading position.

Main body 103 includes a platen 205 formed of a transparent member, a sheet passage guide 207 forming a portion of a path of the original, a source of light 206 illuminating the original at the reading position, a reflector member 208 reflecting the light emitted from the source of light, a reader 213 having three line sensors arranged in a sub scanning direction, a reflector mirror 209 arranged to reflect light reflected from the original and guide the reflection of light to reader 213, a lens 211 focusing the reflection of light on reader 213, an image processor 215 processing an electrical signal output from reader 213, a motor 219 operative to oscillate platen 205, and a motor controller 217 operative in response to a control signal received from image processor 215 to control the driving of motor 219.

An original 200 is transported by timing roller pair 201 between platen 205 and upper restraint plate 203 in a direction D1. The original being transported has its image read at a reading position L by reader 213 successively. ADF 101 transports an original in the sub scanning direction, as seen at a reading position L. During the image reading operation, platen 205 is oscillated by motor 219 in a direction D2. Platen 205 oscillates in a direction substantially parallel to the sub scanning direction.

Reader 213 includes three line sensors each having a plurality of photoelectric conversion elements arranged in a main scanning direction substantially perpendicular to the sub scanning direction. The three line sensors have filters, respectively, different in spectral sensitivity and receive light reflected from an original through the filters. More specifically, the sensors have filters transmitting light of waveforms of red (R), green (G) and blue (B). Thus, the line sensor having the filter of red (R) outputs an R signal, an electrical signal indicating an intensity of red light of light reflected from an original, the line sensor having the filter of green (G) outputs a G signal, an electrical signal indicating an intensity of green light of light reflected from the original, and the line sensor having the filter of blue (B) outputs a B signal, an electrical signal indicating an intensity of blue light of light reflected from the original.

The three line sensors are arranged in the sub scanning direction in a predetermined order with a predetermined distance therebetween. In this example, the line sensors are spaced by a distance corresponding to three original reading lines, and arranged, red first, followed by green and then blue as seen in the direction in which an original is transported, although the line sensors may be spaced by different distances and arranged in different orders.

The three line sensors thus spaced and arranged simultaneously receive at the same timing the light reflected by an original at different locations. As such, the light reflected by the original at a location is initially received by the red light receiving line sensor, subsequently by the green light receiving line sensor, and finally by the blue light receiving line sensor. This delay is adjusted by image processor 215, as will be described later.

Note that while in the present embodiment reader 213 is provided with three line sensors, it may be provided with four or more line sensors.

Figure 3:
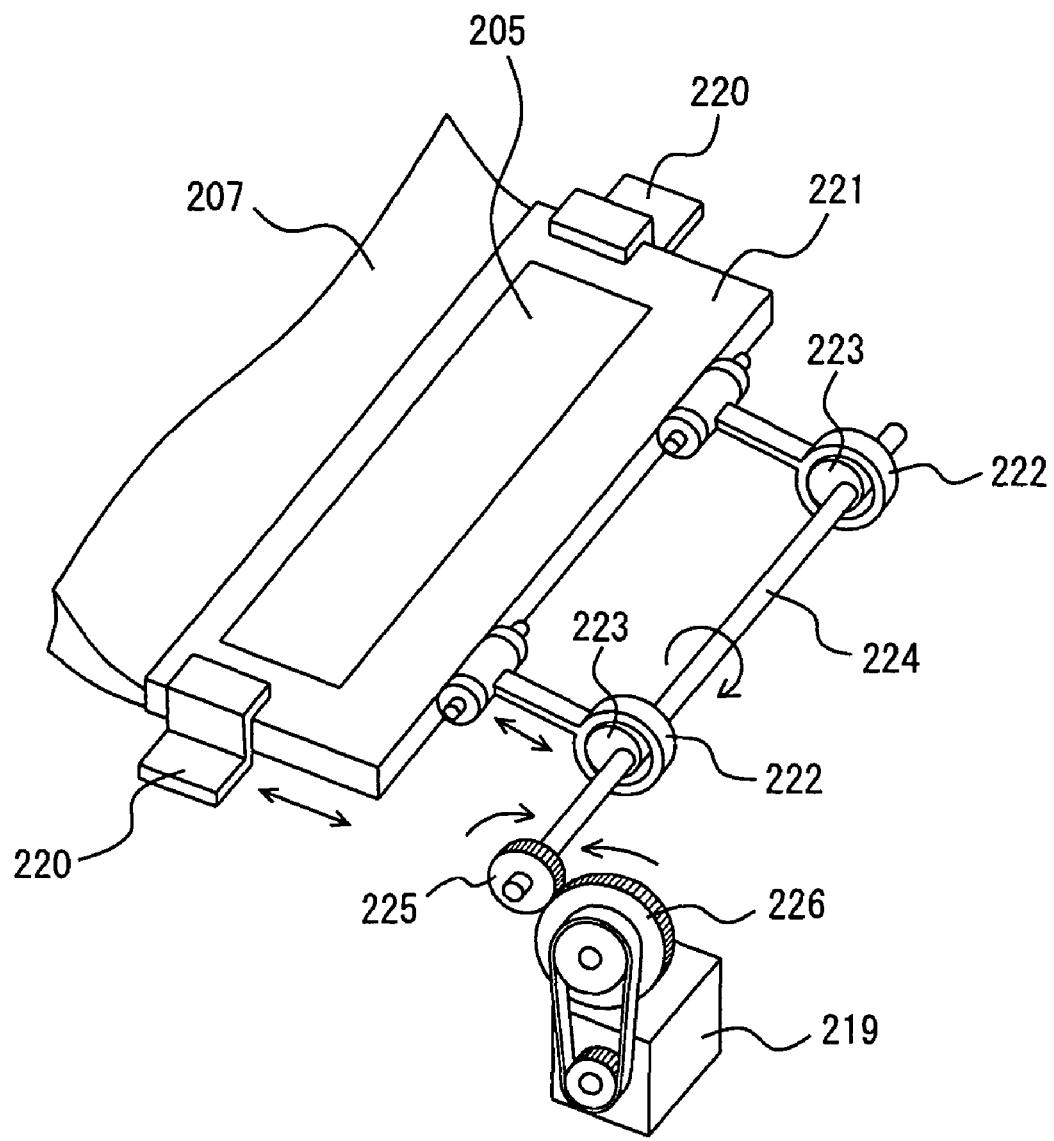
FIG. 3 is a perspective view of a mechanism employed to oscillate a platen.

FIG. 3 is a perspective view showing a mechanism employed to oscillate the platen. With reference to the figure, platen 205 is held by a platen holder 221 held slidably in the sub scanning direction by a guide 220 fixed to the main body of image reading apparatus 10. Platen holder 221 has one surface with two arms 222 connected thereto. Arm 222 has the other end provided with a circular hole.

A shaft 224 at portions corresponding to the two arms 222 has two cams 223 attached thereto. Furthermore, shaft 224 has one end with a gear 225 attached thereto. Gear 225 is arranged to mesh with a gear 226 linked by a belt to the motor 219 drive shaft. As motor 219 runs, the motor's rotation is transmitted by the belt to gear 226, and gear 226 thus rotates. As gear 226 rotates, gear 225 and shaft 224 rotate.

Cam 223 is arranged in the circular hole of arm 222. As such, as shaft 224 rotates, the two cams 223 accordingly provide rotation, which is converted to translation movement of platen holder 221.

Note that platen 205 may be oscillated by a mechanism other than that described above. For example, the platen may be oscillated by a mechanism employing a driving source, such as a piston utilizing an electromagnet, air pressure, hydraulic pressure and the like, causing linear movement.

Platen 205 is oscillated parallel to the sub scanning direction. When platen 205 is moving in a direction opposite that in which an original is transported, platen 205 and the original move in the opposite directions. As such, the speed of platen 205 relative to line sensors 213R, 213G, 213B and that of the original relative to the line sensors are different. In contrast, when platen 205 is moving in the direction in which the original is transported, the speed of platen 205 and that of the original transported are the same in direction. Preferably, they should be different in rate. Note that while herein platen 205 is oscillated parallel to the sub scanning direction, the platen may be oscillated in different directions.

Figure 4A:
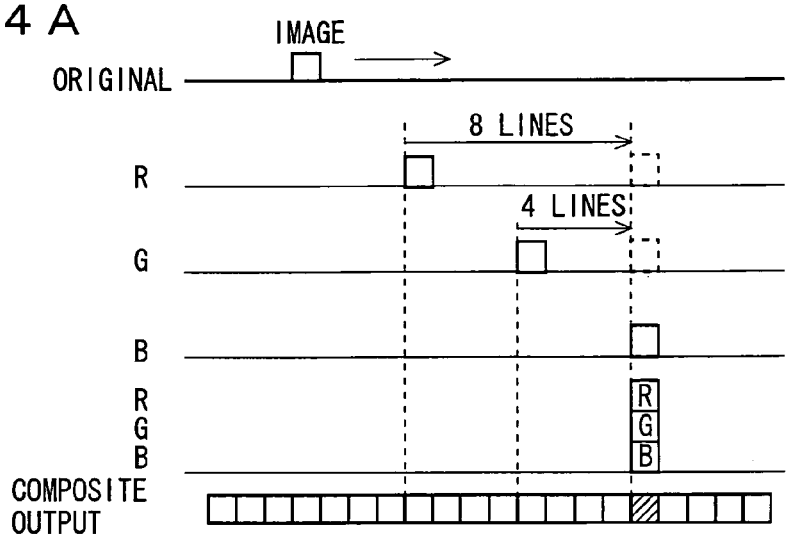
FIGS. 4A-4C are diagrams for illustrating a theory of detecting noise generated by reading dust from a read image.
Figure 4B:
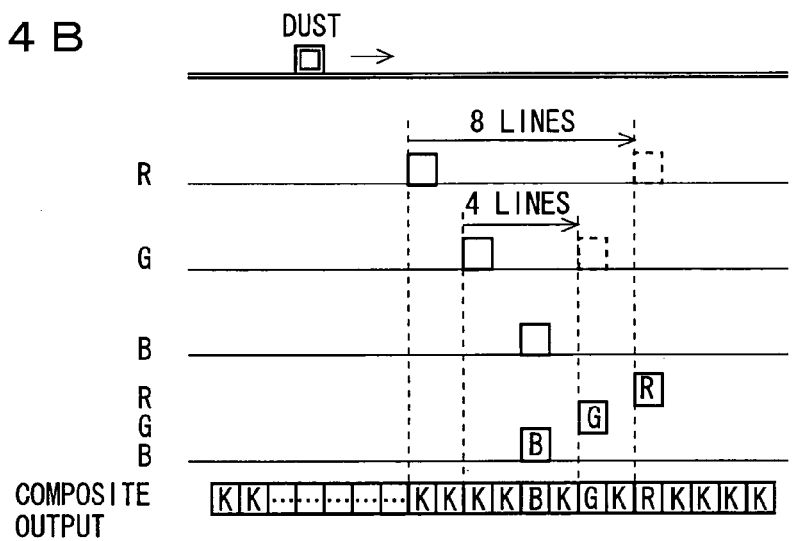
Figure 4C:
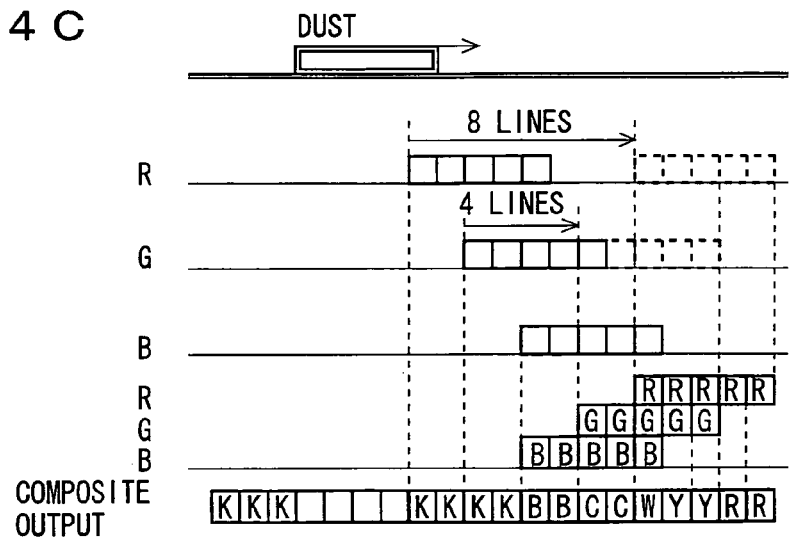

In the present embodiment image reading apparatus 10 detects noise generated by dust adhering on platen 205 from a read image in accordance with a theory as described hereinafter. FIGS. 4A-4C are diagrams for illustrating the theory. For the sake of illustration, an original and platen 205 are transported in the figures in a direction indicated by an arrow, and platen 205 moves at a rate which is the same in direction as and twice in magnitude that at which the original is transported. Furthermore for the sake of illustration the three line sensors are red light, green light and blue light receiving line sensors arranged red first, followed by green and then blue in the direction in which the original is transported, with a distance corresponding to three lines therebetween R, G and B indicate outputs of the red light, green light and blue light receiving line sensors, respectively.

FIG. 4A is a diagram for illustrating interline correction. The image of a portion of the original is initially read by the red light receiving line sensor arranged most upstream in the direction in which the original is transported. The image is then transported by a distance corresponding to four lines, and read by the green light receiving line sensor. The image is further transported by a distance corresponding to four lines, and read by the blue light receiving sensor.

Thus an image located in an original at a single location is read by three line sensors at different times. As such, the three line sensors output signals offset in timing. Interline correction synchronizes the signals output from the three line sensors so that the signals all correspond to a single location in the original. More specifically, output R is delayed by eight lines and output G is delayed by four lines.

Interline corrected outputs R, G and B are composited to provide a composite output, which corresponds to outputs R, G and B read at a single location in an original and composited together.

FIG. 4B is a diagram for illustrating a composite output provided when dust adhering on a platen is read. The dust adhering on platen 205 is initially read by the red light receiving line sensor arranged most upstream in the direction in which an original is transported. The dust is transported by a distance corresponding to four lines, and read by the green light receiving line sensor. Since platen 205 moves in the same direction as the original at a rate twice that at which the original is transported, the dust moves by four lines in a period of time required for a line sensor to read the original by two lines. As such, between the time point at which the red line sensor reads the dust and that at which the green line sensor reads the dust there is introduced an offset by a period of time corresponding to reading two lines. Furthermore, the dust is transported by a distance corresponding to four lines, and read by the blue light receiving line sensor. Since platen 205 moves in the same direction as the original at a rate twice that at which the original is transported, between the time point at which the green line sensor reads the dust and that at which the blue line sensor reads the dust there is introduced an offset by a period of time corresponding to reading two lines.

By interline correction the red light receiving line sensor reading the dust outputs R delayed by eight lines and the green light receiving line sensor reading the dust outputs G delayed by four lines. As such, interline corrected outputs R, G and B composited together provide a composite output in which outputs R, G and B with the dust read are not composited at the same timing, offset by two lines.

Note that the figure shows a composite output provided when paper particles or similar white dust adhere on platen 205 and a black original is read. Despite that the white dust is read, the composite output is not white but rather an output of blue, green and red divided in three lines.

FIG. 4C is another diagram for illustrating a composite output provided when dust adhering on a platen is read. The figure shows an example of reading dust having a size corresponding to ten lines in the sub scanning direction. Platen 205 moves in the same direction as an original at a rate twice that at which the original is transported. As such, the dust is read as having a size corresponding to five lines.

The dust adhering on platen 205 is initially read by the red light receiving line sensor arranged most upstream in the direction in which the original is transported. The dust is then transported by a distance corresponding to four lines, and read by the green light receiving line sensor. Between the time point at which the red line sensor reads the dust and that at which the green line sensor reads the dust there is introduced an offset by a period of time corresponding to reading two lines. The dust further is transported by a distance corresponding to four lines, and read by the blue light receiving line sensor. Between the time point at which the green line sensor reads the dust and that at which the blue line sensor reads the dust there is introduced an offset by a period of time corresponding to reading two lines.

By interline correction the red light receiving line sensor reading the dust outputs R delayed by eight lines and the green light receiving line sensor reading the dust outputs G delayed by four lines. As such, interline corrected outputs R, G and B composited together provide a composite output in which outputs R, G and B by five lines with the dust read are not composited at the same timing, offset by two lines. Note that the figure shows a composite output provided when paper particles or similar white dust adhere on platen 205 and a black original is read. Despite that the white dust is read, the composite output is an output varying in color, first in blue, followed by cyan, white yellow and then red.

The dust adhering on platen 205 is thus divided in an image into a plurality of lines, which are extracted for each color as a feature point to detect noise. Furthermore, such division also reduces noise caused by reading the dust.

FIG. 5 is a plan, rear view of the platen. With reference to the figure, platen 205 has one end with a mark 205A having a single color and a geometry having in the main scanning direction a length varying depending on the position in the sub scanning direction. In this description, mark 205A is a black triangle. Furthermore, mark 205A has one side arranged parallel to one side of platen 205.

Reader 213 or a sensor provided separate from reader 213 and fixed to main body 103 can be used to detect the length of mark 205A in the main scanning direction to detect the position of platen 205 relative to reader 213.

Figure 6:
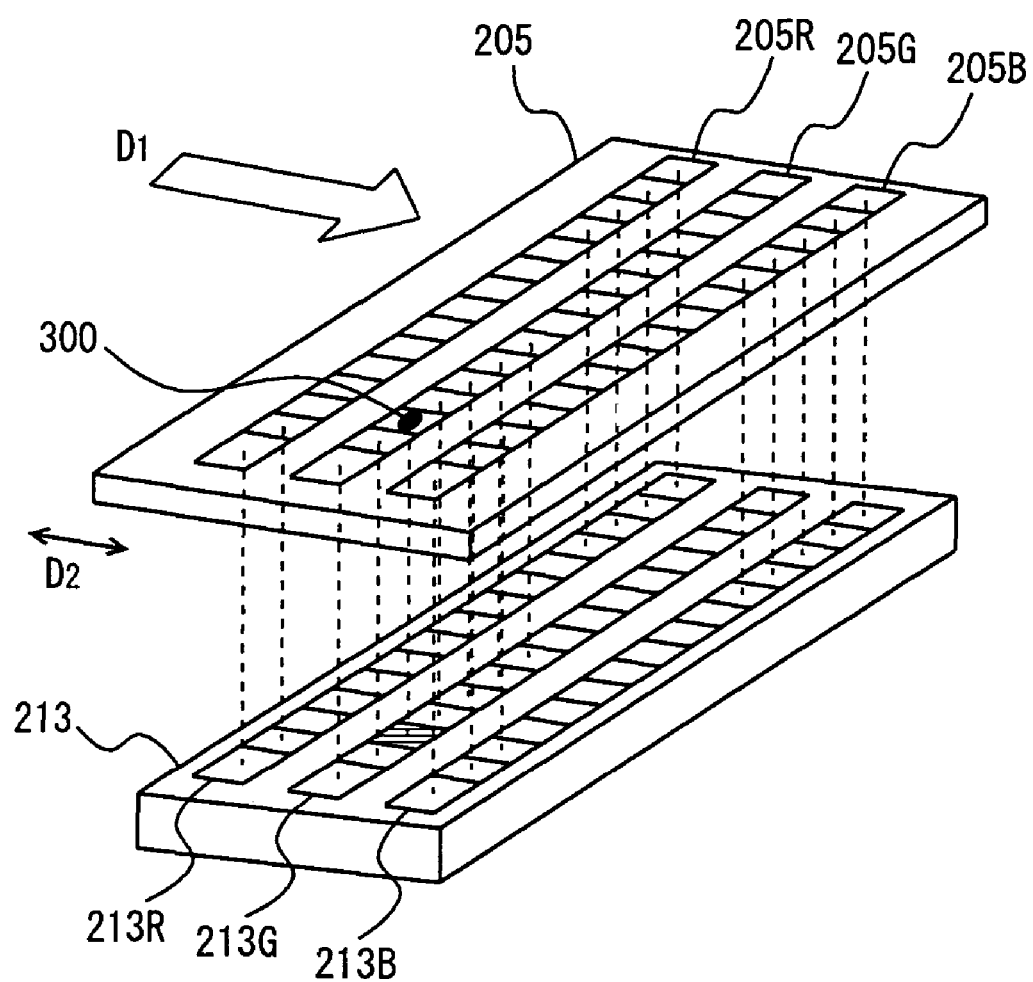
FIG. 6 shows a position on a platen read by a reader.

FIG. 6 shows a location on platen 205 read by reader 213. Reader 213 has line sensors 213R, 213G and 213B having filters of red (R), green (G) and blue (B), respectively, arranged in a direction in which an original is transported D1, red first, followed by green and then blue.

Line sensors 213R, 213G and 213B receive light transmitted through platen 205 at regions 205R, 205G and 205B, respectively. Regions 205R, 205G and 205B are arranged to be spaced by three lines. The original initially moves past region 205R, then region 205G and finally region 205B. As such, light reflected by the original at a location is initially received by the red light receiving line sensor 213R, then the green light receiving line sensor 213G, and finally the blue light receiving line sensor 213B. Line sensors 213R, 213G, 213B spaced by three lines thus will not simultaneously receive light reflected by the original at a single location.

If platen 205 has adhering thereto dust 300 having a maximal length of at most four lines, then dust 300 will not exist at two or more of regions 205R, 205G, 205B concurrently as platen 205 moves oscillating parallel to the sub scanning direction. FIG. 6 shows a case where dust 300 exists at region 205G. In this case, light reflected by dust 300 is received only by line sensor 213G and not received by line sensor 213R or 213B.

Furthermore, as platen 205 oscillates, dust 300 will exists at different regions. More specifically, when platen 205 moves in direction D1, dust 300 initially exists at region 205R, then region 205G and finally region 205B. In contrast, when platen 205 moves in a direction opposite direction D1, dust 300 exists initially at region 205B, then region 205G, and finally region 205R.

As such, light reflected by dust 300 is received in such an order that when platen 205 moves in direction D1 the light is received initially by line sensor 213R, then line sensor 213G and finally line sensor 213B and when platen 205 moves opposite to direction D1 the light is received initially by line sensor 213B, then line sensor 213G, and finally line sensor 213R.

When platen 205 is moving in the direction in which the original is transported, noise resulting from reading of the dust appears first in the R signal output from line sensor 213R, then in the G signal output from line sensor 213G and finally in the B signal output from line sensor 213B. When platen 205 is moving in the direction opposite to the direction in which the original is transported, noise resultant from reading of the dust appears first in the B signal output from line sensor 213B, then in the G signal output from line sensor 213G and finally in the R signal output from line sensor 213R. In other words, in what order the noise appears in the signals is determined by the direction in which platen 205 is moved. The order of the signals having noise therein detected can be determined to improve precision in detecting the noise.

Figure 7:
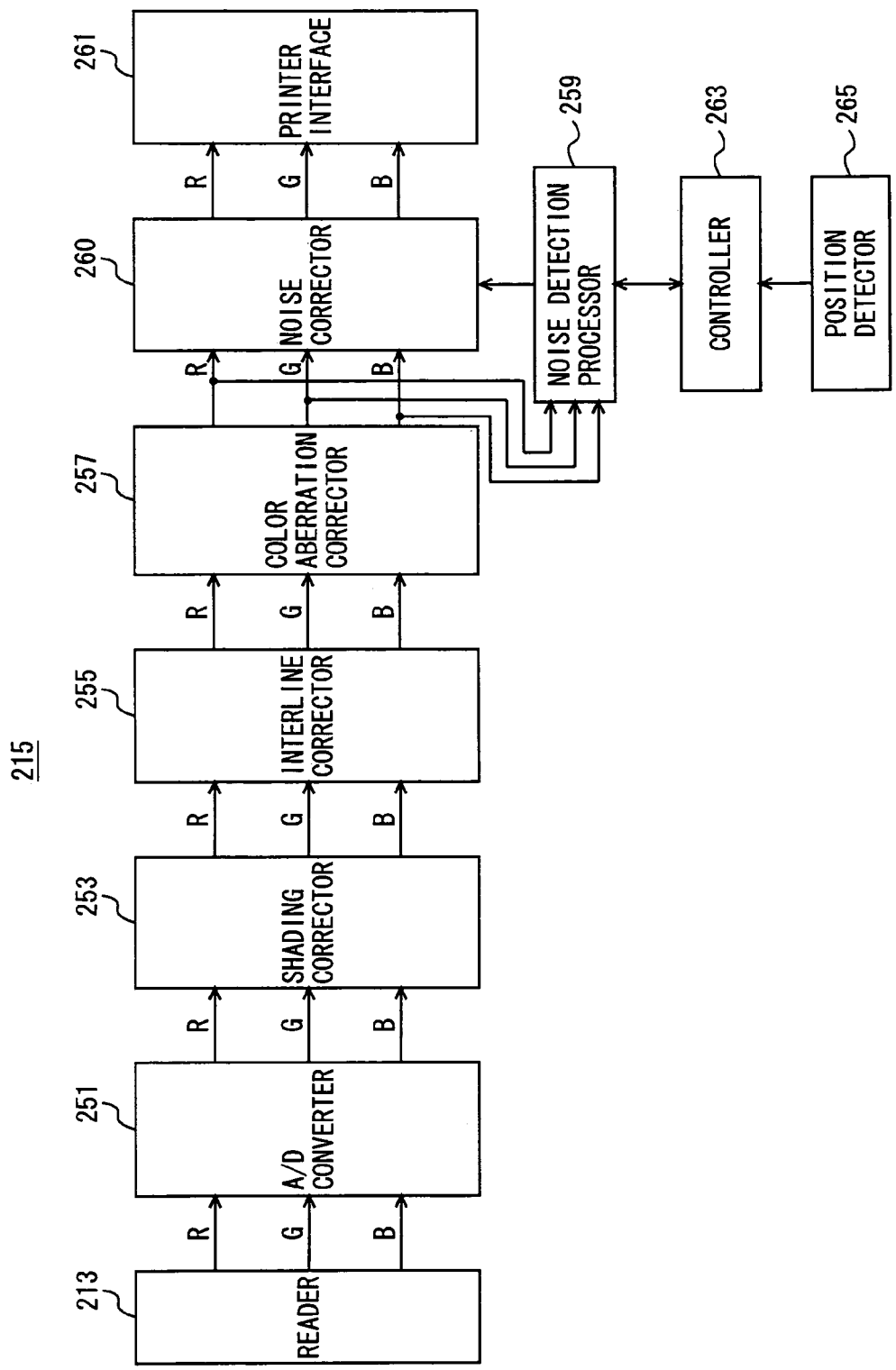
FIG. 7 is a block diagram showing a configuration of an image processor of the image reading apparatus in the present embodiment.

FIG. 7 is a block diagram showing a configuration of the image processor of the image reading apparatus in the present embodiment. With reference to the figure, image processor 215 receives R, G and B signals from reader 213. Image processor 215 includes an analog/digital (A/D) converter 251 receiving an analog signal from reader 213 to convert the analog signal to a digital signal, a shading corrector 253 correcting uneven illumination provided by the source of light 206 or the like, an interline corrector 255 synchronizing the R, G and B signals to be a single line of an original, a color aberration corrector 257 correcting distortion in the main scanning direction introduced by lens 211, a noise detection processor 259 detecting noise from each of the R, G and B signals, a noise corrector 260 effecting a process to correct a noise pixel, a controller 263 generally controlling image processor 215, and a printer interface 261 used to output an image to image forming apparatus 20. Controller 263 has a position detector 265 connected thereto to detect the position of platen 205. Position detector 265 detects a length of mark 205A of platen 205 in the main scanning direction.

Interline corrector 255 delays the R and G signals by eight and four lines, respectively, to synchronize the R, G and B signals to be a single line of the original, since as has been described previously, line sensors 213R, 213G, 213B are spaced in the sub scanning direction by a distance corresponding to three lines.

Noise detection processor 259 receives the R. G and B signals from color aberration corrector 257 and from controller 263 the position of platen 205 and a direction in which platen 205 moves. Noise detection processor 259 detects a noise pixel for each of the R, G and B signals received from color aberration corrector 257, and outputs to noise corrector 260 and controller 263 logical signals of "1" and "0" indicating a noise pixel and a pixel other than a noise pixel, respectively. The detail will be described later.

Noise corrector 260 receives the R, G and B signals from color aberration corrector 257 and from noise detection processor 259 receives for each of the R, G and B signals logical signal of "1" and "0" indicating a noise pixel and a pixel other than a noise pixel, respectively.

Noise corrector 260 replaces, for each of the R, G and B signals, based on a logical signal corresponding thereto, the value of a pixel determined as a noise pixel with that of a neighboring non-noise pixel. Noise corrector 260 outputs to the printer interface the R, G and B signals with the noise pixel replaced with the neighboring pixel.

Controller 263 receives the position of platen 205 from position detector 265 and from noise detection processor 259 logical signals of "1" and "0" indicating a noise pixel and a pixel other than noise pixel, respectively. Controller 263 determines from these signals the dust's location on platen 205. More specifically, it determines the position of platen 205 in the sub scanning direction from the position of platen 205 and a logical signal's line number, and the position of platen 205 in the main scanning direction from a location of a noise pixel of the logical signal.

The noise detection process will more specifically be described hereinafter. As has been described with reference to FIG. 6, line sensors 213R, 213G and 213B will read different locations on an original at the same timing. Interline corrector 255 synchronizes the R, G and B signals' lines to obtain R, G and B signals having read a single location on the original.

As such, if platen 205 has dust adhering thereon, R, G and B signals having read a single location on an original have one of them affected.

Figure 8:
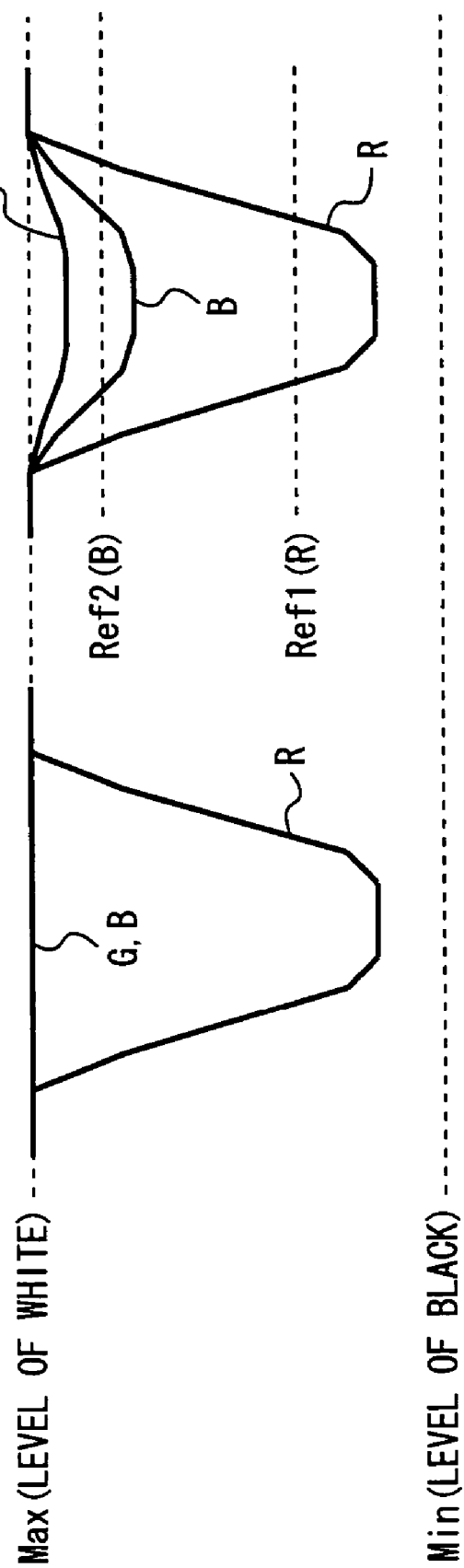
FIGS. 8A and 8B represent one example of RGB signal output from the reader.

FIGS. 8A and 8B represent an example of RGB signal output from the reader. FIG. 8A shows an example of reading a white area of an original with black dust adhering on the platen's region 205R corresponding to line sensor 213R. Line sensor 213R reads a portion of the original with the black dust on region 205R. Subsequently, the portion of the original moves to regions 205G, 205B corresponding to line sensors 213G, 213B, when the dust does not exist on regions 205G, 205B, since the original and platen 205 moves at different rates. As such line sensors 213G, 213B will read the original's white area. Consequently, only an R signal output from line sensor 213R is reduced in lightness and line sensors 213G, 213B output G and B signals high in lightness. Note that herein, "lightness" indicates a value output from the three line sensors 213R, 213G, 213B corresponding to a reflection of light.

The FIG. 8A RGB signals' combination is seldom output when an original is read without dust adhering thereto. A combination closest thereto is a case where an area of cyan, a color complementary to red, is read. FIG. 8B represents RGB signal output from reader 213 when an original's cyan area is read. The R signal significantly drops in lightness, and the G and B signals also drops in lightness. As such, the variation in lightness of the R signal significantly dropping in lightness can be detected by using a threshold value Red1(R).

The FIG. 8A RGB signal and the FIG. 8B RGB signal are significantly different in whether the B and G signals are affected. By detecting this difference, black dust can be detected as noise without detecting a cyan line erroneously as noise. As such, the B signal's variation in lightness is detected by using a threshold value Ref2(B). Threshold value Ref2(B)

can simply be provided by the smallest one of the following values. Hereinafter, threshold values Ref2(R), Ref2(G), Ref2 (B) are indicated.

(1) Detecting Dust of Achromatic Color High in Lightness

To prevent a cyan line from being detected erroneously as noise, the difference between a maximum value in lightness (255) and one of the values in lightness output from the line sensors other than line sensor 213R, i.e., line sensors 213G and 213B, reading a color complementary to red, or cyan, can be set as Ref2(G), Ref2(B). To prevent a magenta line from being detected erroneously as noise, the difference between the maximum value in lightness (255) and one of the values in lightness output from the line sensors other than line sensor 213G, i.e., line sensors 213R and 213B, reading a color complementary to green, or magenta, can be set as Ref2(R), Ref2(B). To prevent a yellow line from being detected erroneously as noise, the difference between the maximum value in lightness (255) and one of the values in lightness output from the line sensors other than line sensor 213B, i.e., line sensors 213R and 213G, reading a color complementary to blue, or yellow, can be set as Ref2(R), Ref2(G).

(2) Detecting Dust of Achromatic Color Low in Lightness

To prevent a red line from being detected erroneously as noise, the difference between a minimum value in lightness (0) and one of the values in lightness output from the line sensors other than line sensor 213R, i.e., line sensors 213G and 213B, reading red color, can be set as Ref2(G), Ref2(B). To prevent a green line from being detected erroneously as noise, the difference between the minimum value in lightness (0) and one of the values in lightness output from the line sensors other than line sensor 213G, i.e., line sensors 213R and 213B, reading green color, can be set as Ref2(R), Ref2 (B). To prevent a blue line from being detected erroneously as noise, the difference between the minimum value in lightness (0) and one of the values in lightness output from the line sensors other than line sensor 213B, i.e., line sensors 213R and 213G, reading blue color, can be set as Ref2(R), Ref2(G).

Thus more than one threshold value Ref2(R), Ref2(G), Ref2(B) are obtained, and a minimum value thereof can simply be used.

While herein black dust is detected as noise, dust of achromatic color other than black can also be detected, since any achromatic dust affects all of R, G and B signals.

Furthermore, while herein a white original is read by way of example, an original of any color other than white may be read.

Figure 9:
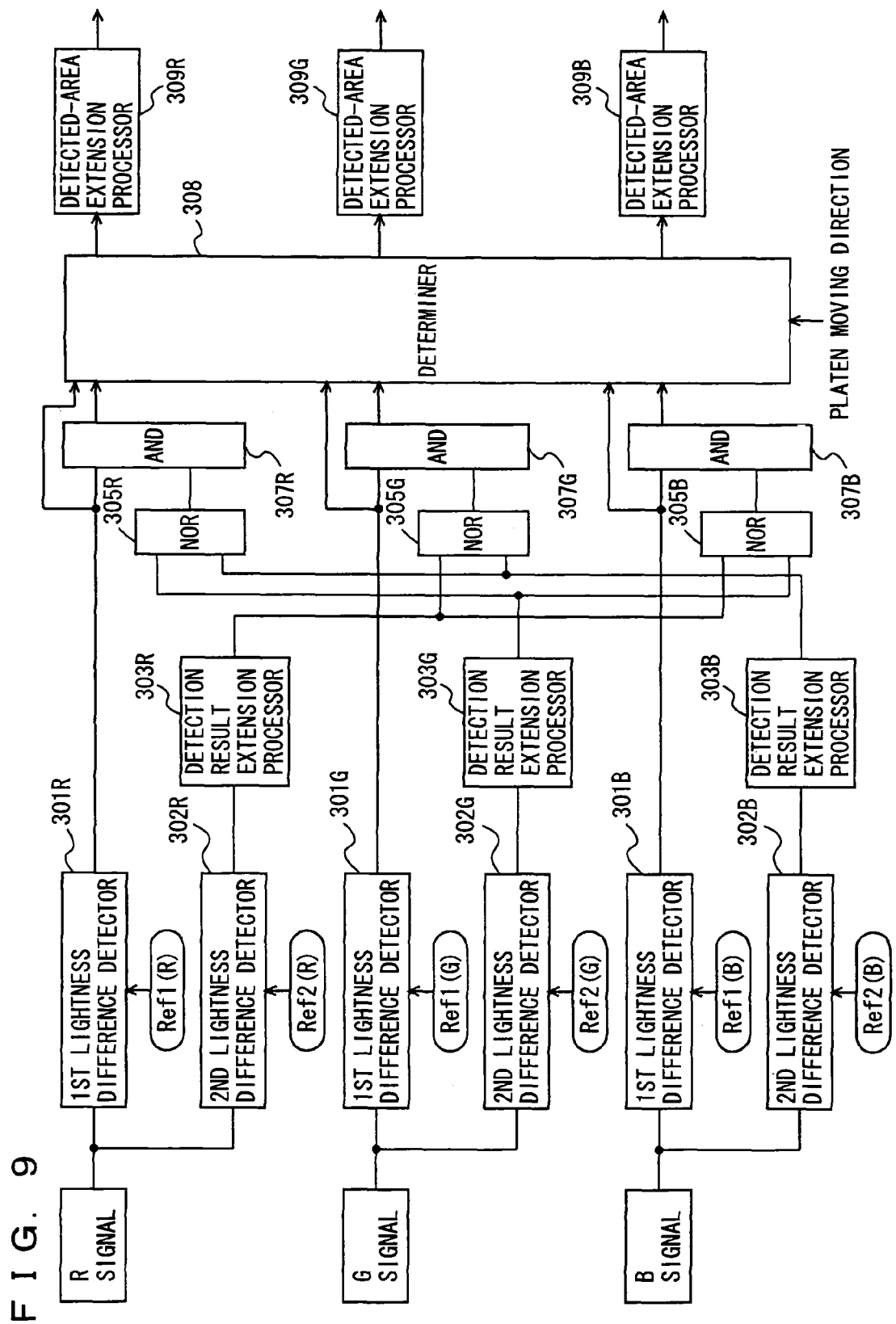
FIG. 9 is a block diagram showing a configuration of a noise detection processor of the image reading apparatus in the present embodiment.

FIG. 9 is a block diagram showing a configuration of the noise detection processor of the image reading apparatus in the present embodiment. With reference to the figure, noise detection processor 259 includes first lightness difference detectors 301R, 301G, 301B extracting from R, G and B signals, respectively, a region having a predetermined feature, second lightness difference detectors 302R, 302G, 302B extracting from R, G and B signals, respectively, a region having the predetermined feature, detection result extension processors 303R, 303G, 303B extending the region extracted by the second lightness detectors 302R, 302G, 302B to a vicinity thereof, NOR devices 305R, 305G, 305B, AND devices 307R, 307G, 307B, a determiner 308, and detected-area extension processors 309R, 309G, 309B.

R, G and B signals are input to noise detection processor 259, one line at a time, sequentially. Note that the R, G and B signals may be input collectively by a plurality of lines or an entire image.

The first lightness difference detector 301R receives the R signal and threshold value Ref1(R) and extracts from the R signal a region having the predetermined feature of a first level. This region is a region having a limited variation in lightness and a difference in lightness of at least threshold Ref1(R) from a region surrounding it. Such region is only required to have a size of at least one pixel. In this description a pixel included in a region having the predetermined feature of the first level will be referred to as a first feature pixel.

The region having the predetermined feature of the first level may be extracted by employing an edge extraction filter. More than one edge extraction filter are prepared for sizes of edge regions, respectively, and a value obtained as a result of filtering is compared with threshold value Ref1(R). A pixel satisfying a condition with threshold value Ref1(R) is determined as a center pixel of an edge region and from an edge extraction filter satisfying that condition the edge region's size is obtained.

FIGS. 10A-10F represent the edge extraction filter by way of example. FIG. 10A represents an edge extraction filter used to detect an edge region of a size of one pixel when an R signal is input, one line at a time. FIG. 10B represents an edge extraction filter used to detect an edge region of a size of one pixel when an R signal is input in a plurality of lines correctively.

FIG. 10C represents an edge extraction filter used to detect an edge region of a size of three pixels when an R signal is input, one line at a time. FIG. 10D represents an edge extraction filter used to detect an edge region of a size of three pixels when an R signal is input in a plurality of lines correctively.

FIG. 10E represents an edge extraction filter used to detect an edge region of a size of five pixels when an R signal is input, one line at a time. FIG. 10D represents an edge extraction filter used to detect an edge region of a size of five pixels when an R signal is input in a plurality of lines correctively.

These edge extraction filters are established under the following conditions:

(1) An edge region high in lightness is extracted when an average in lightness of pixels A and B minus that in lightness of pixel C equals at least threshold value Ref1(R):

(Average of Pixels $A$ and $B$)−(Average of Pixel $C$)>Ref1($R$).

In that case, the center pixel is one of pixels A, B and C that is the highest in lightness.

(2) An edge region low in lightness is extracted when an average in lightness of pixel C minus that in lightness of pixels A and B equals at least threshold value Ref1(R):

(Average of Pixel $C$)−(Average of Pixels $A$ and $B$)>Ref1($R$).

In that case, the center pixel is one of pixels A, B and C that is the lowest in lightness.

G and B signals can also be handled with an edge extraction filter similar to that used for the R signal.

The first lightness difference detectors 301R, 301G, 301B compare a value calculated by the above described edge extraction filter with threshold values Ref1(R), Ref1(G), Ref1 (B).

With reference again to FIG. 9, the first feature pixel extracted by the first lightness difference detector 301R is represented by a logical signal of "1" and a pixel other than the first feature pixel is represented by a logical signal of "0" and thus output to AND device 307R and determiner 308.

The second lightness difference detector 302R receives the R signal and threshold value Ref2(R) and extracts from the R signal a region having the predetermined feature of a second level. This region is a region having a limited variation in lightness and a difference in lightness of at least threshold Ref2(R) from a region surrounding it. Such region is only required to have a size of at least one pixel. In this description a pixel included in a region having the predetermined feature of the second level will be referred to as a second feature pixel. It should be noted that threshold value Ref2(R) is a smaller value than threshold value Ref1(R).

The region having the predetermined feature of the second level may be extracted by employing an edge extraction filter. More than one edge extraction filter are prepared for sizes of edge regions, respectively, and a value obtained as a result of filtering is compared with threshold value Ref2(R). A pixel satisfying a condition with threshold value Ref2(R) is determined as a center pixel of an edge region and from an edge extraction filter satisfying that condition the edge region's size is obtained.

The second lightness difference detectors 302R, 302G, 302B compare a value calculated by the above described edge extraction filter with threshold values Ref2(R), Ref2(G), Ref2(B).

The second feature pixel extracted by the second lightness difference detector 302R is represented by a logical signal of "1" and a pixel other than the second feature pixel is represented by a logical signal of "0" and thus output to detection result extension processor 303R.

Detection result extension processor 303R sets a pixel neighboring the second feature pixel extracted by the second lightness difference detector 302R as a second feature pixel to extend a region having the predetermined feature of the second level. In other words, a pixel that exists in a vicinity of a pixel of "1" in value as represented by a logical signal received from the second lightness difference detector 302R and has a value of "0" is changed to "1". Noise can be detected with higher precision. A logical signal having contributed to extended region is output to NOR devices 305G, 305B.

The first lightness difference detector 301G receives the G signal and threshold value Ref1(G) and extracts from the G signal a region having the predetermined feature of the first level. This region is a region having a limited variation in lightness and a difference in lightness of at least threshold Ref1(G) from a region surrounding it.

The region having the predetermined feature of the first level may be extracted by employing an edge extraction filter. More than one edge extraction filter are prepared for sizes of edge regions, respectively, and a value obtained as a result of filtering is compared with threshold value Ref1(G). A pixel satisfying a condition with threshold value Ref1(G) is determined as a center pixel of an edge region and from an edge extraction filter satisfying that condition the edge region's size is obtained.

The feature pixel extracted by the first lightness difference detector 301G is represented by a logical signal of "1" and a pixel other than the first feature pixel is represented by a logical signal of "0" and thus output to. AND device 307G and determiner 308.

The second lightness difference detector 302G receives the G signal and threshold value Ref2(G) and extracts from the G signal a region having the predetermined feature of the second level. This region is a region having a limited variation in lightness and a difference in lightness of at least threshold Ref2(G) from a region surrounding it. Such region is only required to have a size of at least one pixel. In this description a pixel included in a region having the predetermined feature of the second level will be referred to as a second feature pixel. It should be noted that threshold value Ref2(G) is a smaller value than threshold value Ref1(G).

The region having the predetermined feature of the second level may be extracted by employing an edge extraction filter. More than one edge extraction filter are prepared for sizes of edge regions, respectively, and a value obtained as a result of filtering is compared with threshold value Ref2(G). A pixel satisfying a condition with threshold value Ref2(G) is determined as a center pixel of an edge region and from an edge extraction filter satisfying that condition the edge region's size is obtained.

The second feature pixel extracted by the second lightness difference detector 302G is represented by a logical signal of "1" and a pixel other than the second feature pixel is represented by a logical signal of "0" and thus output to detection result extension processor 303G.

Detection result extension processor 303G sets a pixel neighboring the second feature pixel extracted by the second lightness difference detector 302G as a second feature pixel to extend a region having the predetermined feature of the second level. A logical signal having contributed to an extended region is output to NOR devices 305R, 305B.

The first lightness difference detector 301B receives the B signal and threshold value Ref1(B) and extracts from the B signal a region having the predetermined feature of the first level. This region is a region having a limited variation in lightness and a difference in lightness of at least threshold Ref1(B) from a region surrounding it.

The region having the predetermined feature of the first level may be extracted by employing an edge extraction filter. More than one edge extraction filter are prepared for sizes of edge regions, respectively, and a value obtained as a result of filtering is compared with threshold value Ref1(B). A pixel satisfying a condition with threshold value Ref1(B) is determined as a center pixel of an edge region and from an edge extraction filter satisfying that condition the edge region's size is obtained.

The feature pixel extracted by the first lightness difference detector 301B is represented by a logical signal of "1" and a pixel other than the first feature pixel is represented by a logical signal of "0" and thus output to AND device 307B and determiner 308.

The second lightness difference detector 302B receives the B signal and threshold value Ref2(B) and extracts from the B signal a region having the predetermined feature of the second level. This region is a region having a limited variation in lightness and a difference in lightness of at least threshold Ref2(B) from a region surrounding it. Such region is only required to have a size of at least one pixel. In this description a pixel included in a region having the predetermined feature of the second level will be referred to as a second feature pixel. It should be noted that threshold value Ref2(B) is a smaller value than threshold value Ref1(B).

The region having the predetermined feature of the second level may be extracted by employing an edge extraction filter. More than one edge extraction filter are prepared for sizes of edge regions, respectively, and a value obtained as a result of filtering is compared with threshold value Ref2(B). A pixel satisfying a condition with threshold value Ref2(B) is determined as a center pixel of an edge region and from an edge extraction filter satisfying that condition the edge region's size is obtained.

The second feature pixel extracted by the second lightness difference detector 302B is represented by a logical signal of "1" and a pixel other than the second feature pixel is represented by a logical signal of "0" and thus output to detection result extension processor 303B.

Detection result extension processor 303B sets a pixel neighboring the second feature pixel extracted by the second lightness difference detector 302B as a second feature pixel to extend a region having the predetermined feature of the second level. A logical signal having contributed to an extended region is output to NOR devices 305R, 305G.

NOR device 305R receives from each of detection result extension processor 303G, 303B a logical signal having contributed to an extended region. NOR device 305R outputs to AND device 307R a logical signal corresponding to an inversion of an OR of two received logical signals. More specifically, a pixel which is not a second feature pixel for either a G or B signal is represented by a logical signal of "1" for output and a pixel which is a second feature pixel for at least one of the signals is represented by a logical signal of "0" for output.

AND device 307R outputs to determiner 308 an AND of a logical signal received from the first lightness difference detector 301R and that received from NOR device 305R. More specifically, a pixel which is a first feature pixel for an R signal and not an extended second feature pixel for either a B or G signal is represented by a logical signal "1" and a pixel different therefrom is represented by a logical signal of "0" for output. A pixel of "1" in value as represented by this logical signal indicates a noise pixel. Thus by NOR device 305R and AND device 307R a first feature pixel extracted from an R signal that has not been extracted as an extended second feature pixel for either a G or B signal is determined as a noise pixel.

NOR device 305G receives from each of detection result extension processors 303R, 303B a logical signal having contributed to an extended region. NOR device 305G outputs to AND device 307G a logical signal corresponding to an inversion of an OR of two received logical signals. More specifically, a pixel which is not a second feature pixel for either an R or B signal is represented by a logical signal of "1" for output and a pixel which is a second feature pixel for at least one of the signals is represented by a logical signal of "0" for output.

AND device 307G outputs to determiner 308 an AND of a logical signal received from the first lightness difference detector 301G and that received from NOR device 305G. More specifically, a pixel which is a first feature pixel for a G signal and not an extended second feature pixel for either a R or B signal is represented by a logical signal of "1" and a pixel different therefrom is represented by a logical signal of "0" for output. A pixel of "1" in value as represented by this logical signal indicates a noise pixel. Thus by NOR device 305G and AND device 307G a first feature pixel extracted from a G signal that has not been extracted as an extended second feature pixel for either an R or B signal is determined as a noise pixel.

NOR device 305B receives from each of detection result extension processors 303R, 303G a logical signal having contributed to an extended region. NOR device 305B outputs to AND device 307B a logical signal corresponding to an inversion of an OR of two received logical signals. More specifically, a pixel which is not a second feature pixel for either an R or G signal is represented by a logical signal of "1" for output and a pixel which is a second feature pixel for at least one of the signals is represented by a logical signal of "0" for output.

AND device 307B outputs to determiner 308 an AND of a logical signal received from the first lightness difference detector 301B and that received from NOR device 305B. More specifically, a pixel which is a first feature pixel for a B signal and not an extended second feature pixel for either an R or G signal is represented by a logical signal of "1" and a pixel different therefrom is represented by a logical signal of "0" for output. A pixel of "1" in value as represented by this logical signal indicates a noise pixel. Thus by NOR, device 305B and AND device 307B a first feature pixel extracted from a B signal that has not been extracted as an extended second feature pixel for either an R or G signal is determined as a noise pixel.

Determiner 308 receives from the first lightness difference detectors 301R, 301G, 301B the logical signal of "1" representing the first feature pixel of R, G and B signals each, from AND devices 307R, 307G, 307B the logical signal of "1" representing the noise pixel of R, G and B signals each, and from controller 263 the direction in which platen 205 is moved. Determiner 308 determines whether or not the pixel determined as a noise pixel is valid or not. A detailed description of determiner 308 is given hereinlater.

If detected-area extension processor 309R receives a logical signal of "1" from AND device 307R for a pixel, detected-area extension processor 309R sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

If detected-area extension processor 309G receives a logical signal of "1" from AND device 307G for a pixel, detected-area extension processor 309G sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

If detected-area extension processor 309B receives a logical signal of "1" from AND device 307B for a pixel, detected-area extension processor 309B sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

Figure 11:
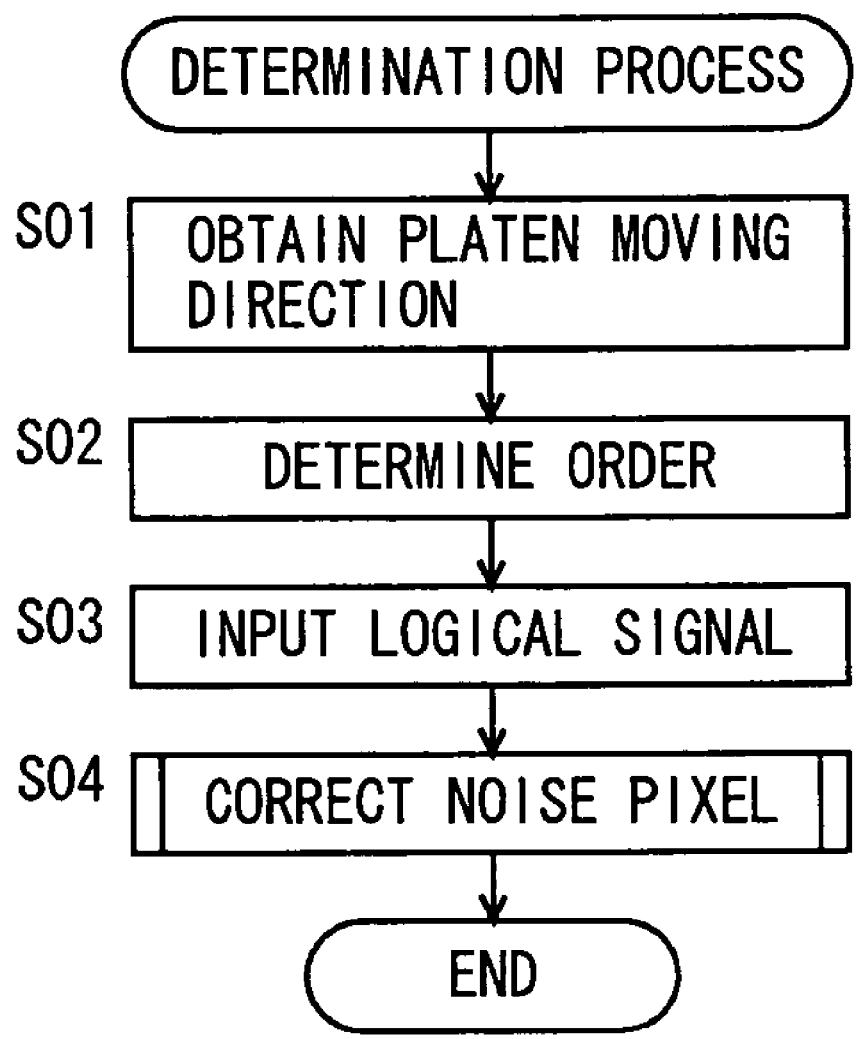
FIG. 11 is a flowchart showing a flow of a process followed by a determiner of the noise detection processor.

FIG. 11 is a flowchart showing a flow of a determination process followed by the determiner of the noise detection processor. The determination is made each time logical signals corresponding to the R, G and B signals are input. Logical signals corresponding to respective R, G and B signals are input in the order in which line sensors 213R, 213G, 213B output respective R, G and B signals. With reference to FIG. 11, in the determination process followed by determiner 308, the direction in which platen 205 is moved is first provided (step S01). Then, the order in which noise pixels are detected from the R, G and B signals is determined (step S02).

Based on the direction in which platen 205 is moved, the order in which noise pixels are expected to be detected from the R, G and B signals is determined, i.e., it is determined from which signals noise pixels are expected to be firstly, secondly and thirdly detected respectively. A signal from which the noise pixel is expected to be detected firstly is herein referred to as first signal, a signal from which the noise pixel is expected to be detected secondly is herein referred to as second signal, and a signal from which the noise pixel is expected to be detected thirdly is herein referred to as third or last signal. This order is determined in the following manner on the basis of the three conditions.

(1) In the case where platen 205 is moved in the same direction as that in which the original is transported and at a lower rate than the rate at which the original is transported, the first signal is the R signal output from line sensor 213R, the second signal is the G signal output from line sensor 213G and the third signal is the B signal output from line sensor 213B.

(2) In the case where platen 205 is moved in the same direction as that in which the original is transported and at a higher rate than the rate at which the original is transported, the first signal is the B signal output from line sensor 213B, the second signal is the G signal output from line sensor 213G and the third signal is the R signal output from line sensor 213R.

(3) In the case where platen 205 is moved in the opposite direction to the direction in which the original is transported, the first signal is the B signal output from line sensor 213B, the second signal is the G signal output from line sensor 213G and the third signal is the R signal output from line sensor 213R. In this case the relation between the magnitude of the rate at which platen 205 is moved and the magnitude of the rate at which the original is transported is irrelevant to the order in which noise pixels are detected from the signals.

In step S03, logical signals corresponding to the R, G and B signals are input. Then, noise pixel correction for three logical signals is made (step S04).

Figure 12:
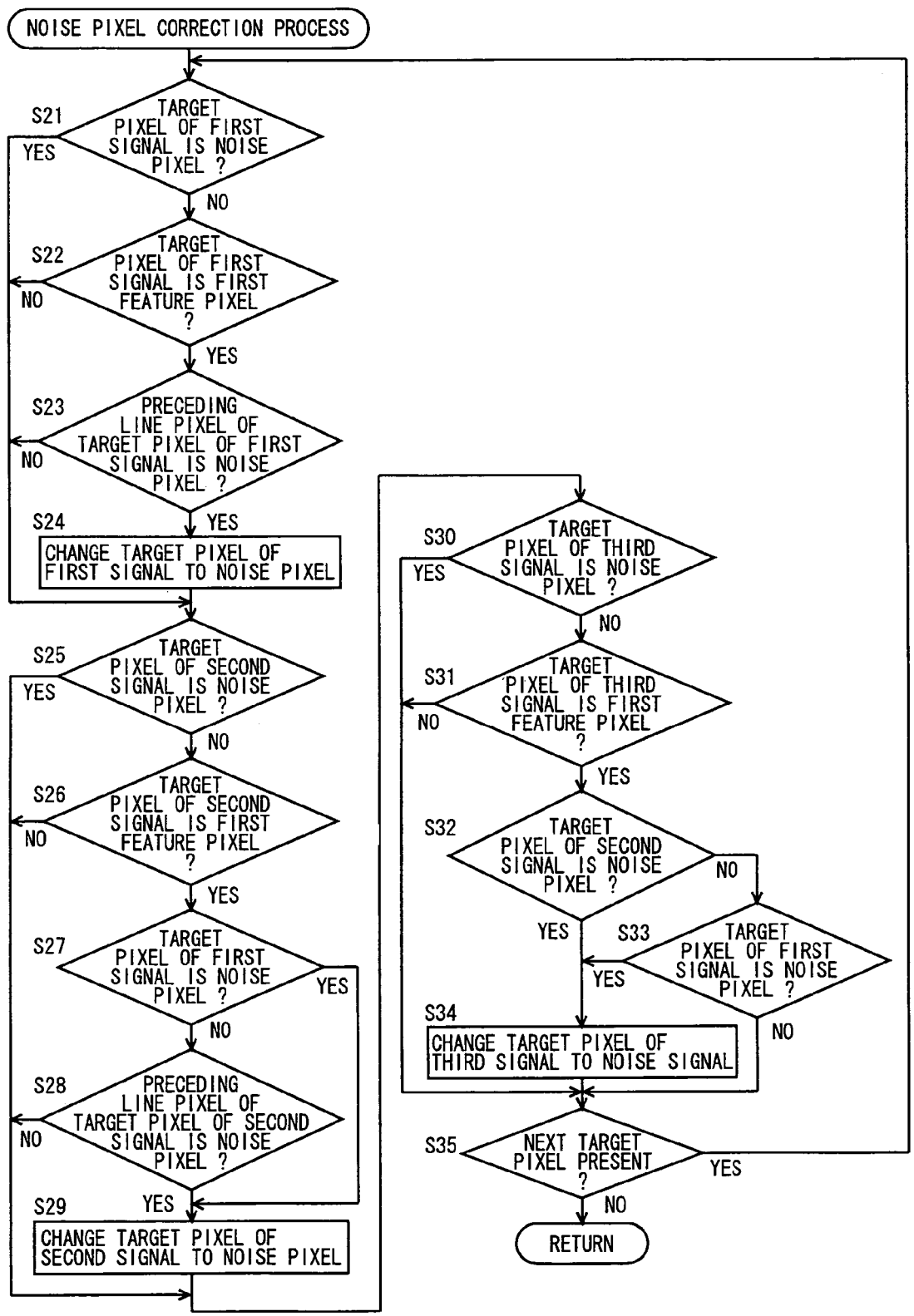
FIG. 12 is a flowchart showing a flow of a noise pixel correction process in step S04 of FIG. 11.

FIG. 12 is a flowchart showing a flow of the noise pixel correction in step S04 of FIG. 11. With reference to FIG. 12, in the process of the noise pixel correction, a target pixel is selected from the first one of R, G and B signals to determine whether or not the target pixel is a noise pixel (step S21). Here, the target pixel is a pixel to be subjected to the noise pixel correction. Noise detection processor 259 receives a logical signal corresponding to the R signal and representing a noise pixel as "1", a logical signal corresponding to the G signal and representing a noise pixel as "1" and a logical signal corresponding to the B signal and representing a noise pixel as "1". Accordingly, in this noise pixel correction process, if a target pixel of a logical signal corresponding to the first signal is "1", the target pixel is determined as a noise pixel. Thus, if the target pixel is a noise pixel, the process proceeds to step S25. If not, the process proceeds to step S22.

In step S22, it is determined whether or not the target pixel of the first signal is a first feature pixel. If so, the process proceeds to step S23. If not, the process proceeds to step S25. When the process proceeds to step S23, the target pixel of the first signal is not a noise pixel but the first feature pixel. In this case, a target pixel of the second signal is a first feature pixel, a target pixel of the third signal is a first feature pixel, or respective target pixels of the second and third signals are first feature pixels. In such a case, the target pixel of the first signal could be a pixel that reads dust adhering on platen 205. In the following steps, it is determined whether or not the target pixel of the first signal is a pixel that reads dust adhering on platen 205. Here, in such a case where a target pixel of the first signal and a target pixel of the third signal are first feature pixels and a target pixel of the second signal is not a first feature pixel, it is possible for example that white dust adheres on platen 205 while a green region of an original is being read.

In step S23, it is determined whether or not the pixel of the preceding line that is at the same position in the main scanning direction as the target pixel of the first signal has been determined as a noise pixel. If so, the process proceeds to step S24. If not, the process proceeds to step S25. This determination is made on the basis of a logical signal that is previously input to noise detection processor 259 and representing the noise pixel of the line having been subjected to the noise pixel correction as "1".

In step S24, the target pixel of the first signal is changed to a noise pixel. Specifically, value "0" of the target pixel of the logical signal corresponding to the first signal and representing a noise pixel as "1" is changed to "1" Namely, when the target pixel of the first signal is the first feature pixel and the pixel of the preceding line that is at the same position in the main scanning direction as the target pixel of the first signal is a noise pixel, the target pixel of the first signal is changed to the noise pixel.

The target pixel of the first signal is changed to the noise pixel in step S24 on the condition that:

the target pixel of the first signal is the first feature pixel, at least one of the target pixel of the second signal and the target pixel of the third signal is the first feature pixel and the pixel of the preceding line that is at the same position in the main scanning direction as the target pixel of the first signal is a noise pixel.

In the following step S25, it is determined whether or not the target pixel of the second signal is a noise pixel. If so, the process proceeds to step S30. If not, the process proceeds to step S26.

In step S26, it is determined whether or not the target pixel of the second signal is a first feature pixel. If so, the process proceeds to step S27. If not, the process proceeds to step S30. When the process proceeds to step S27, the target pixel of the second signal is not a noise pixel but the first feature pixel. In this case, the target pixel of the first signal is a first feature pixel, the target pixel of the third signal is a first feature pixel, or respective target pixels of the first and third signals are first feature pixels. In such a case, the target pixel of the second signal could be a pixel that reads dust adhering on platen 205. In the following steps, it is determined whether or not the target pixel of the second signal is a pixel that reads dust adhering on platen 205.

In step S27, it is determined whether or not the target pixel of the first signal is a noise pixel. If so, the process proceeds to step S29. If not, the process proceeds to step S28. When the target pixel of the first signal is a noise pixel, the target pixel of the second signal is changed to a noise pixel.

In step S28, it is determined whether or not the pixel of the preceding line that is at the same position in the main scanning direction as the target pixel of the second signal has been determined as a noise pixel. If so, the process proceeds to step S29. If not, the process proceeds to step S30. This determination is made on the basis of a logical signal that is previously input to noise detection processor 259 and representing the noise pixel of the line having been subjected to the noise pixel correction as "1".

In step S29, the target pixel of the second signal is changed to a noise pixel. Specifically, value "0" of the target pixel of the logical signal corresponding to the second signal and representing a noise pixel as "1" is changed to "1". In step S29, the target pixel of the second signal is changed to the noise pixel on the following condition:

(1) the target pixel of the second signal is the first feature pixel and the target pixel of the first signal is the noise pixel, this condition including the condition that respective target pixels of the second and first signals are first feature pixels and the pixel of the preceding line that is at the same position in the main scanning direction as the target pixel of the first signal is a noise pixel; or (2) respective target pixels of the second and third signals are first feature pixels and the pixel of the preceding line that is at the same position in the main scanning direction as the target pixel of the second signal is a noise pixel.

In the subsequent step S30, it is determined whether or not the target pixel of the third signal is a noise pixel. If so, the process proceeds to step S35. If not, the process proceeds to step S31.

In step S31, it is determined whether or not the target pixel of the third signal is a first feature pixel. If so, the process proceeds to step S32. If not, the process proceeds to step S35. When the process proceeds to step S32, the target pixel of the third signal is not a noise pixel but the first feature pixel. In this case, the target pixel of the first signal is the first feature pixel, the target pixel of the second signal is the first feature pixel, or respective target pixels of the first and second signals are the first feature pixels, and it is possible that the target pixel of the third signal is a pixel that reads dust adhering on platen 205. In the following steps, it is determined whether or not the target pixel of the third signal is a pixel that reads dust adhering on platen 205.

In step S32, it is determined whether or not the target pixel of the second signal is a noise pixel. If so, the process proceeds to step S34. If not, the process proceeds to step S33. When the target pixel of the second signal is a noise pixel, the target pixel of the third signal is determined as a noise pixel.

In step S33, it is determined whether or not the target pixel of the first signal is a noise pixel. If so, the process proceeds to step S34. If not, the process proceeds to step S35. Namely, when the target pixel of the first signal is a noise pixel, the target pixel of the third signal is determined as a noise pixel. If the first feature pixel is not detected from the second signal, the first feature pixel detected from the third signal is determined as a noise pixel, in such a case where white dust adheres on platen 205 while a green region of an original is being read.

In step S34, the target pixel of the third signal is changed to a noise pixel. Specifically, value "0" of the target pixel of the logical signal corresponding to the third signal and representing a noise pixel as "1" is changed to "1". In step S34, the target pixel of the third signal is changed to the noise pixel on the following condition:

(1) the target pixel of the third signal is the first feature pixel and the target pixel of the second signal is the noise pixel, this condition including the condition that respective target pixels of the third and second signals are first feature pixels and the pixel of the preceding line that is at the same position in the main scanning direction as the target pixel of the second signal is a noise pixel; or (2) the target pixel of the third signal is the first feature pixel and the target pixel of the first signal is the noise pixel, this condition including the condition that respective target pixels of the third and first signals are first feature pixels and the pixel of the preceding line that is at the same position in the main scanning direction as the target pixel of the first signal is a noise pixel.

In the subsequent step S35, it is determined whether or not a subsequent target pixel is present. If so, the process returns to step S21. If not, the process is ended. In this way, the noise pixel correction is made for all pixels of logical signals input to noise detection processor 259.

With noise pixel corrector 311, first feature pixels extracted from at least two of the R, G and B signals are corrected to noise pixels on the condition that, for one of the R, G and B signals, the pixel of the preceding line that is at the same position in the main scanning direction as the first feature pixel is a noise pixel. In this way, even if large dust adheres on platen 205 that results in first feature pixels extracted from at least two of the R, G and B signals, noise can be detected from the R, G and B signals.

Figure 13:
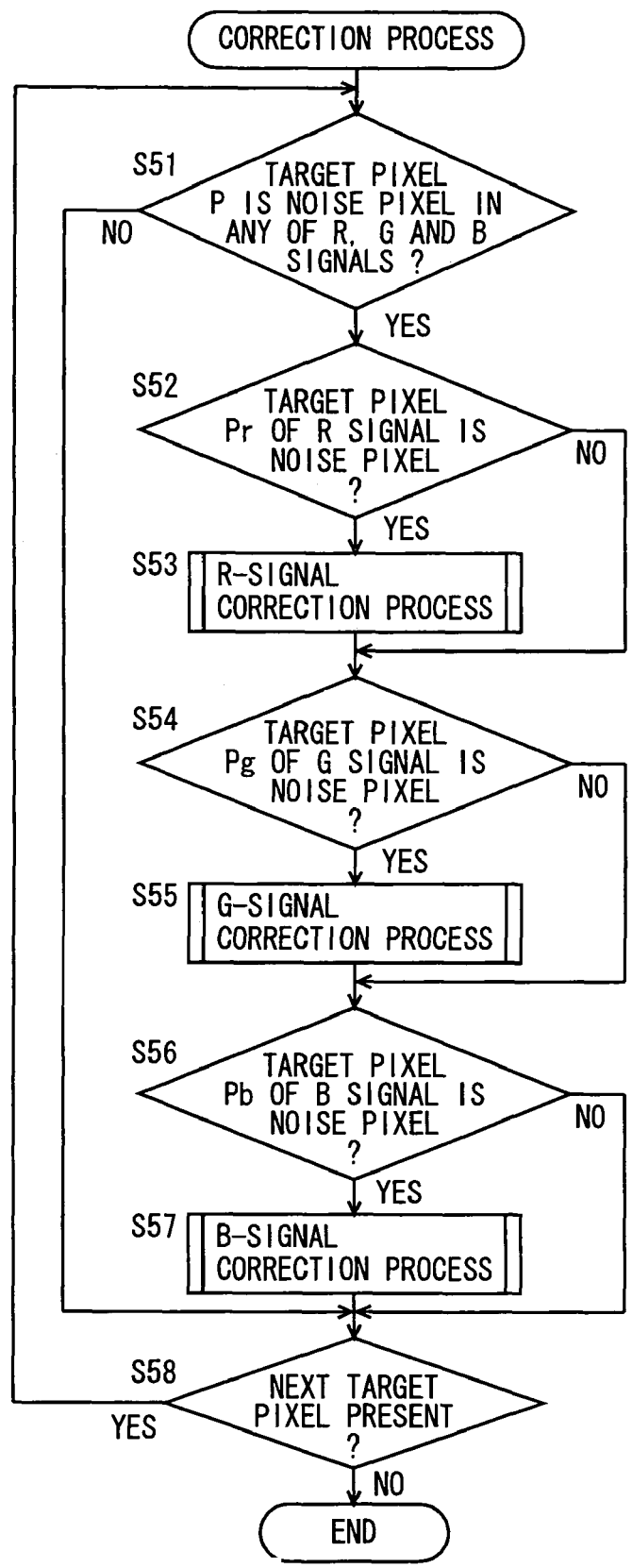
FIG. 13 is a flowchart showing a flow of a correction process followed by a noise corrector.

FIG. 13 is a flowchart showing a flow of a correction process followed by the noise corrector. To noise corrector 260, R, G and B signals and logical signals corresponding to the R, G and B signals and representing a noise pixel as "1" are input. In the correction process, these signals are used to correct a noise pixel.

With reference to FIG. 13, a target pixel P of the input R, G and B signals for a line is set as a pixel to be processed, and it is determined whether or not target pixel P is a noise pixel in any of the R, G and B signals (step S51). If so, the process proceeds to step S52. If not, the process proceeds to step S58.

In step S52, it is determined whether or not target pixel Pr of the R signal is a noise pixel. If so, the process proceeds to step S53. If not, the process skips step S53 and proceeds to step S54. In step S53, an R-signal correction is made to correct target pixel Pr of the R signal. For example, target pixel Pr may be replaced with the average, maximum or minimum value of a plurality of non-noise pixels neighboring target pixel Pr.

In step S54, it is determined whether or not target pixel Pg of the G signal is a noise pixel. If so, the process proceeds to step S55. If not, the process skips step S55 and proceeds to step S56. In step S55, a G-signal correction is made to correct target pixel Pg of the G signal. For example, target pixel Pg may be replaced with the average, maximum or minimum value of a plurality of non-noise pixels neighboring target pixel Pg.

In step S56, it is determined whether or not target pixel Pb of the B signal is a noise pixel. If so, the process proceeds to step S57. If not, the process skips step S57 and proceeds to step S58. In step S57, a B-signal correction is made to correct target pixel Pb of the B signal. For example, target pixel Pb may be replaced with the average, maximum or minimum value of a plurality of non-noise pixels neighboring target pixel Pb.

In step S58, it is determined whether or not there is a pixel to be used as the next target pixel. If present, the process returns to step S51 and repeats the aforementioned procedure. If not, this process is ended.

Figure 14:
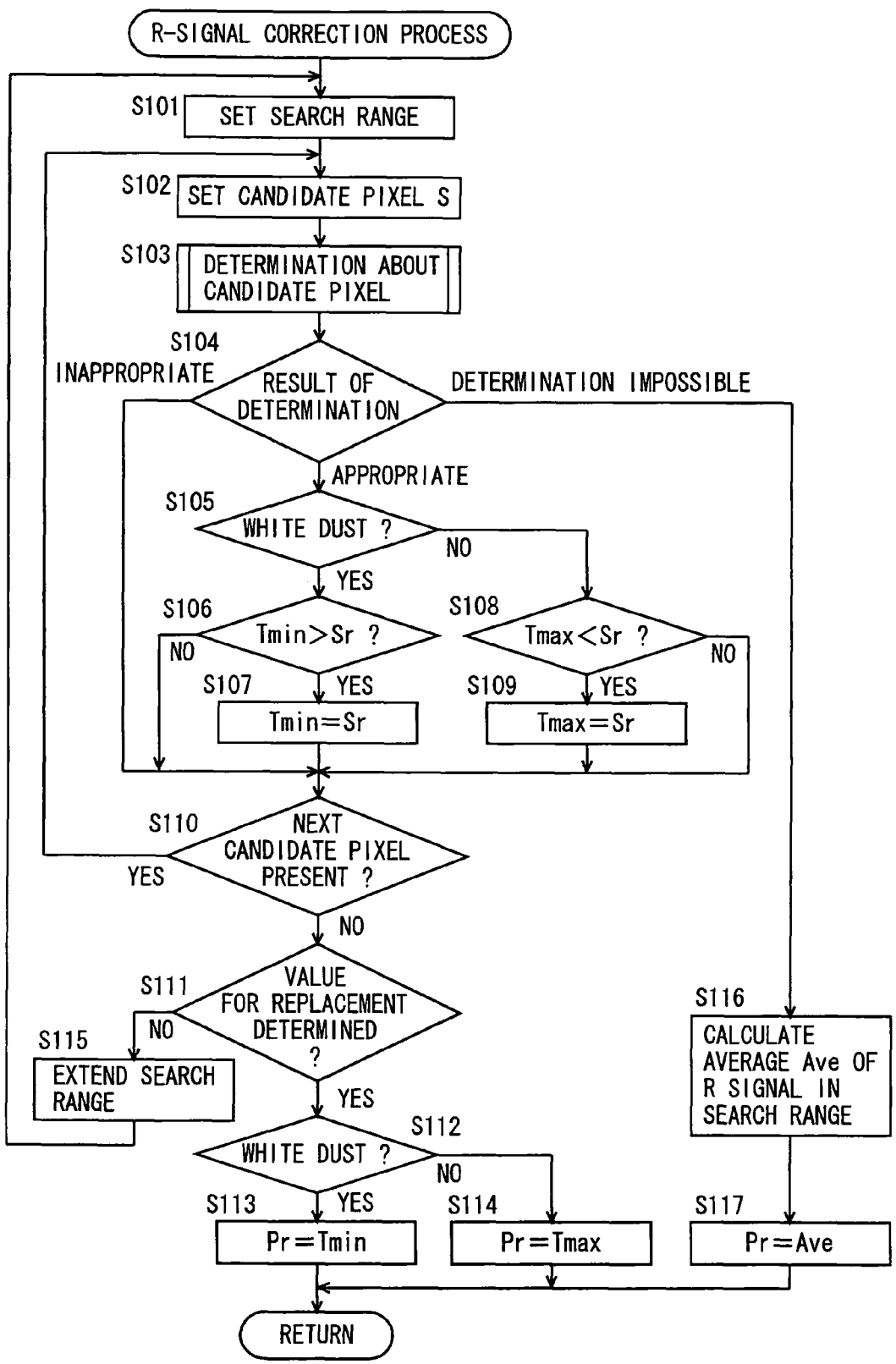
FIG. 14 is a flowchart showing a flow of an R-signal correction process in step S53 of FIG. 13.

FIG. 14 is a flowchart showing a flow of the R-signal correction process in step S53 of FIG. 13. With reference to FIG. 14, in the R-signal correction process, a search range is set. The search range is defined with reference to target pixel P.

Figure 15A:
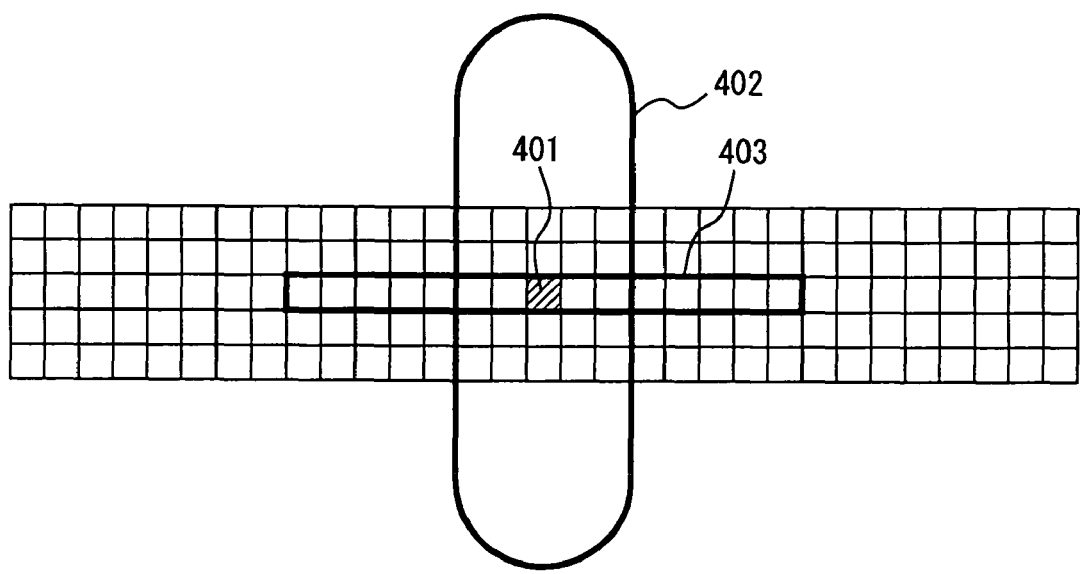
FIGS. 15A and 15B show exemplary search ranges.
Figure 15B:
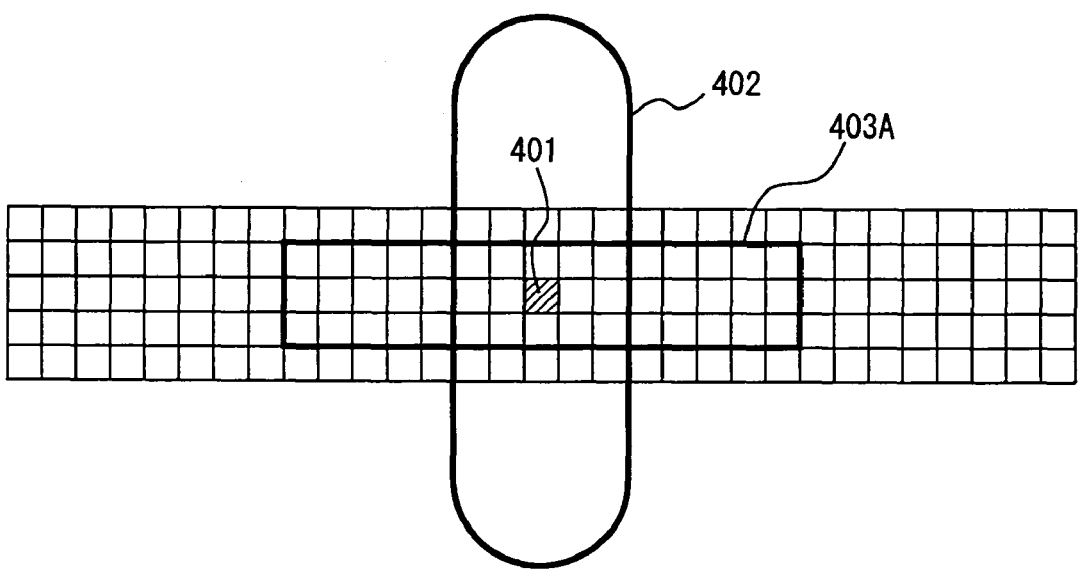

FIGS. 15A and 15B show exemplary search ranges. In FIGS. 15A and 15B, a signal is represented in two-dimensional form and one box represents one pixel. Pixels within noise 402 are detected as noise pixels. With reference to FIG. 15A, supposing that a pixel 401 is a target pixel P, a search range 403 is defined by the range including pixel 401, seven pixels on the right thereof and seven pixels on the left thereof that are arranged in the main scanning direction. Here, search range 403 is not limited to the exemplified size herein shown and may be larger or smaller than this size. The search range may be any that includes noise pixels and pixels that are not noise pixels.

With reference again to FIG. 14, in step S102, a candidate pixel S is selected from the pixels included in the search range that is set in step S101. In the subsequent step S103, a determination is made as to whether or not the candidate pixel is appropriate for correcting target pixel P. In the process of making the determination regarding the candidate pixel, one of a return value indicating the result of the determination as to whether or not candidate pixel. S selected in step S 102 is appropriate for correcting target pixel P and a return value indicating that the determination cannot be made is returned.

In the subsequent step S104, the process proceeds to step S105 if candidate pixel S selected in step S 102 is appropriate for correcting target pixel P. If not, the process proceeds to step S110. If it cannot be determined whether or not the candidate pixel is appropriate, the process proceeds to step S116.

It is determined that a pixel is appropriate as a candidate pixel if all of the following conditions are satisfied:

(1) candidate pixel S is not a noise pixel in any of the R, G and B signals; and (2) for a signal of target pixel P that is not a noise pixel, respective values of target pixel P and candidate pixel S are close to each other.

In step S105, it is determined whether or not target pixel P is a noise pixel that reads white dust. This determination is made by comparing value Pr of target pixel P of the R signal with a predetermined value. If value Pr is larger than the predetermined value, it can be determined that the target pixel is a noise pixel reading white dust because of the high lightness. If it is determined that the target pixel is a noise pixel reading white dust, the process proceeds to step S106. If not, namely if the target pixel is a noise pixel reading black dust, the process proceeds to step S108. Alternatively, a determination may be made as to whether or not target pixel P is a noise pixel reading black dust and then it may be determined whether or not value Pr of target pixel P of the R signal is smaller than a predetermined value. If Pr is smaller than the predetermined value, it can be determined that the target pixel is a noise pixel reading black dust because of the low lightness.

In step S106, it is determined whether or not a value Sr of candidate pixel S of the R signal is smaller than a variable Tmin. If so, the process proceeds to step S107. If not, the process skips step S107 and proceeds to step S110. Variable Tmin is a variable for storing the minimum value of value Sr of candidate pixel S of the R signal, among pixels in the search range, for which the determination of appropriateness is made in step S103. Here, the initial value of variable Tmin is set to a value larger than the maximum value "255" of the pixel value.

In step S108, it is determined whether or not value Sr of candidate pixel S of the R signal is larger than a variable Tmax. If so, the process proceeds to step S109. If not, the process skips step S109 and proceeds to step S110. Variable Tmax is a variable for storing the maximum value of value Sr of candidate pixel S of the R signal, among pixels in the search range, for which the determination as to appropriateness is made in step S103. Here, the initial value of variable Tmax is set to a value smaller than the minimum value "0" of the pixel value.

In step S110, it is determined whether or not the next candidate pixel is present in the search range. If so, the process returns to step S102. If not, the process proceeds to step S111. Namely, all pixels included in search range 403 are successively set as a candidate pixel (step S110) and the operation described above is performed on each candidate pixel. Accordingly, as variable Tmin, the minimum value of candidate pixel S of the R signal that is appropriate and included in the search range is stored. Variable Tmin is a value for correcting value Pr of target pixel P of the R signal when target pixel P of the R signal is a noise pixel resultant from reading white dust. As variable Tmax, the maximum value of the candidate pixel of the R signal that is appropriate and included in the search range is stored. Variable Tmax is a value for correcting value Pr of target pixel P of the R signal when target pixel P of the R signal is a noise pixel resultant from reading black dust.

In step S111, it is determined whether or not a value for replacement is determined. If target pixel P is a noise pixel reading white dust and variable Tmin is equal to or smaller than 255, variable Tmin is used as a value for replacement and the process proceeds to step S112. If target pixel P is a noise pixel reading black dust and variable Tmax is equal to or larger than zero, variable Tmax is used as a value for replacement and the process proceeds to step S112. Otherwise, the process proceeds to step S115.

In step S112, it is determined whether or not target pixel P is a noise pixel reading white dust. If so, the process proceeds to step S113. If not, namely target pixel P is a noise pixel reading black dust, the process proceeds to step S114. Alternatively, it may be determined whether or not target pixel P is a noise pixel reading black dust.

In step S113, value Pr of target pixel P of the R signal is set to the value stored as variable Tmin that is a value for replacement of the white dust. In step S114, value Pr of target pixel P of the R signal is set to the value stored as variable Tmax that is a value for replacement of the black dust. Then this process returns to the correction process.

In step S115, the search range set in step S101 is extended in the sub scanning direction and the resultant search range is used as a new search range.

FIG. 15B shows an exemplary search range that is generated by extending the search range shown in FIG. 15A in the sub scanning direction. In FIG. 15B, a search range 403A has three lines including additional two lines on respective sides of the search range with respect to the sub scanning direction, as compared with the search range shown in FIG. 15A. The degree of extension is not limited to the exemplified one and the search range may have five lines with additional two lines on each side with respect to the sub scanning direction.

With reference again to FIG. 14, in step S115, the extended search range is defined and the process returns to step S101. Accordingly, using the new extended search range, the above-described process is followed.

The process proceeds to step S116 if it cannot be determined whether or not a pixel in the search range is candidate pixel S appropriate for correction. Thus, in step S116, average value Ave of pixels in the search range of the R signal is calculated. Naturally, in calculating average value Ave, value Pr of target pixel P of the R signal is not used. In step S117, value Pr of target pixel P of the R signal is set to the calculated average value Ave and the process is ended.

Figure 16:
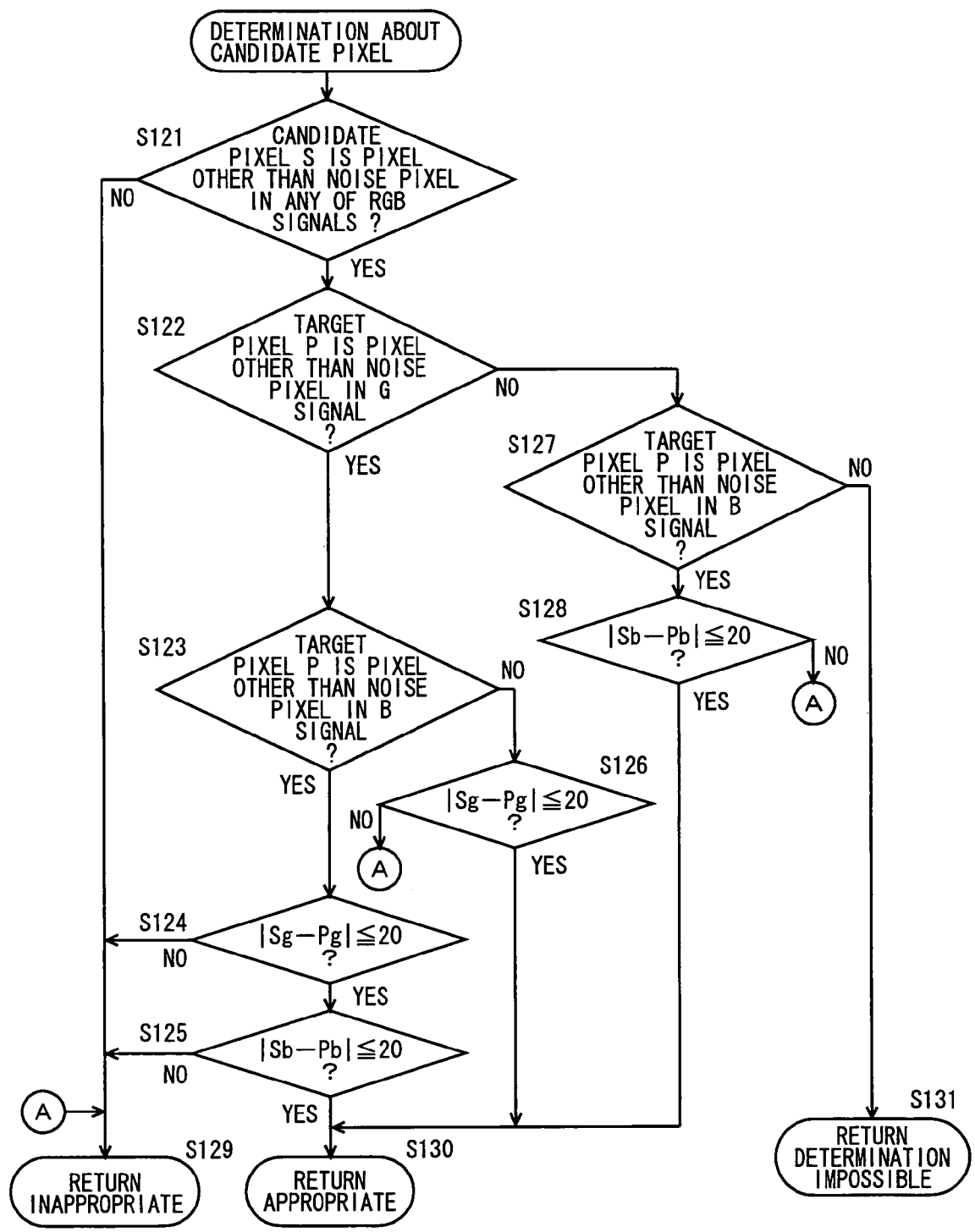
FIG. 16 is a flowchart showing a flow of a determination process for a candidate pixel in step S103 of FIG. 14.

FIG. 16 is a flowchart showing a flow of the determination process for the candidate pixel in step S103 of FIG. 14. With reference to FIG. 16, in the process of making the determination regarding the candidate pixel, it is determined whether or not candidate pixel S is a pixel other than a noise pixel in any of the R, G and B signals (step S121). If candidate pixel S is not a noise pixel in any of the R, G and B signals, the process proceeds to step S122 and otherwise to step S129. In step S129, the signal "inappropriate" indicating that the candidate pixel is inappropriate for correcting the target pixel is returned to the R-signal correction process, and the current process is ended.

In step S122, it is determined whether or not target pixel P is a pixel other than a noise pixel in the G signal. If so, the process proceeds to step S123. If not, the process proceeds to step S127. In step S123, it is determined whether or not target pixel P is a pixel other than a noise pixel in the B signal. If so, the process proceeds to step S124. If not, the process proceeds to step S126.

In step S127, it is determined whether or not target pixel P is a pixel other than a noise pixel in the B signal. If so, the process proceeds to step S128. If not, the process proceeds to step S131.

The process proceeds to step S124 when the R signal of target pixel P is to be corrected and target pixel P is not a noise pixel in remaining two signals, i.e., G and B signals. The process proceeds to step S126 or S128 when the R signal of target pixel P is to be corrected and target pixel P is not a noise pixel in at least one of the remaining G and B signals. When the process proceeds to step S126, target pixel P of the G signal is not a noise pixel. When the process proceeds to step S128, target pixel P of the B signal is not a noise pixel. When the process proceeds to step S131, target pixel P is a noise pixel in all of the R, G and B signals. In this case, the signal "determination impossible" indicating that the determination as to whether or not the candidate pixel is appropriate cannot be made is returned to the R-signal correction process, and the current process is ended.

In step S124, using the fact that target pixel P of the G signal is not a noise pixel, it is determined whether or not the absolute value of the difference between a value Sg of candidate pixel S of the G signal and a value Pg of target pixel P of the G signal is equal to or smaller than 20. If so, the process proceeds to step S125. If not, the process proceeds to step S129. It is thus determined whether or not value Sg of candidate pixel S of the G signal is close to value Pg of target pixel P of the G signal. The threshold value is not limited to "20".

In step S125, using the fact that target pixel P of the B signal is not a noise pixel, it is determined whether or not the absolute value of the difference between a value Sb of candidate pixel S of the B signal and a value Pb of target pixel P of the B signal is equal to or smaller than 20. If so, the process proceeds to step S130. If not, the process proceeds to step S129. It is thus determined whether or not value Sb of candidate pixel S of the B signal is close to value Pb of target pixel P of the B signal. The threshold value is not limited to "20".

Through steps S124 and S125, candidate pixel S for correcting value Pr of target pixel P of the R signal that is a noise pixel is selected. Then, the signal "appropriate" indicating that candidate pixel S selected in step S130 is appropriate for correcting target pixel P is returned to the R-signal correction process and the current process is ended.

In step S126, using the fact that target pixel P of the G signal is not a noise pixel, it is determined whether or not the absolute value of the difference between value Sg of candidate pixel S of the G signal and value Pg of target pixel P of the G signal is equal to or smaller than 20. If so, the process proceeds to step S130. If not, the process proceeds to step S129. It is thus determined whether or not value Sg of candidate pixel S of the G signal is close to value Pg of target pixel P of the G signal. The threshold value is not limited to "20".

In step S128, using the fact that target pixel P of the B signal is not a noise pixel, it is determined whether or not the absolute value of the difference between value Sb of candidate pixel S of the B signal and value Pb of target pixel P of the B signal is equal to or smaller than 20. If so, the process proceeds to step S130. If not, the process proceeds to step S129. It is thus determined whether or not value Sb of candidate pixel S of the B signal is close to value Pb of target pixel P of the B signal. The threshold value is not limited to "20".

Through step S126 or S128, candidate pixel S for correcting value Pr of target pixel P of the R signal that is a noise pixel is selected. Then, the signal "appropriate" indicating that candidate pixel S selected in step S130 is appropriate for correcting target pixel P is returned to the R-signal correction process and the current process is ended.

Figure 17:
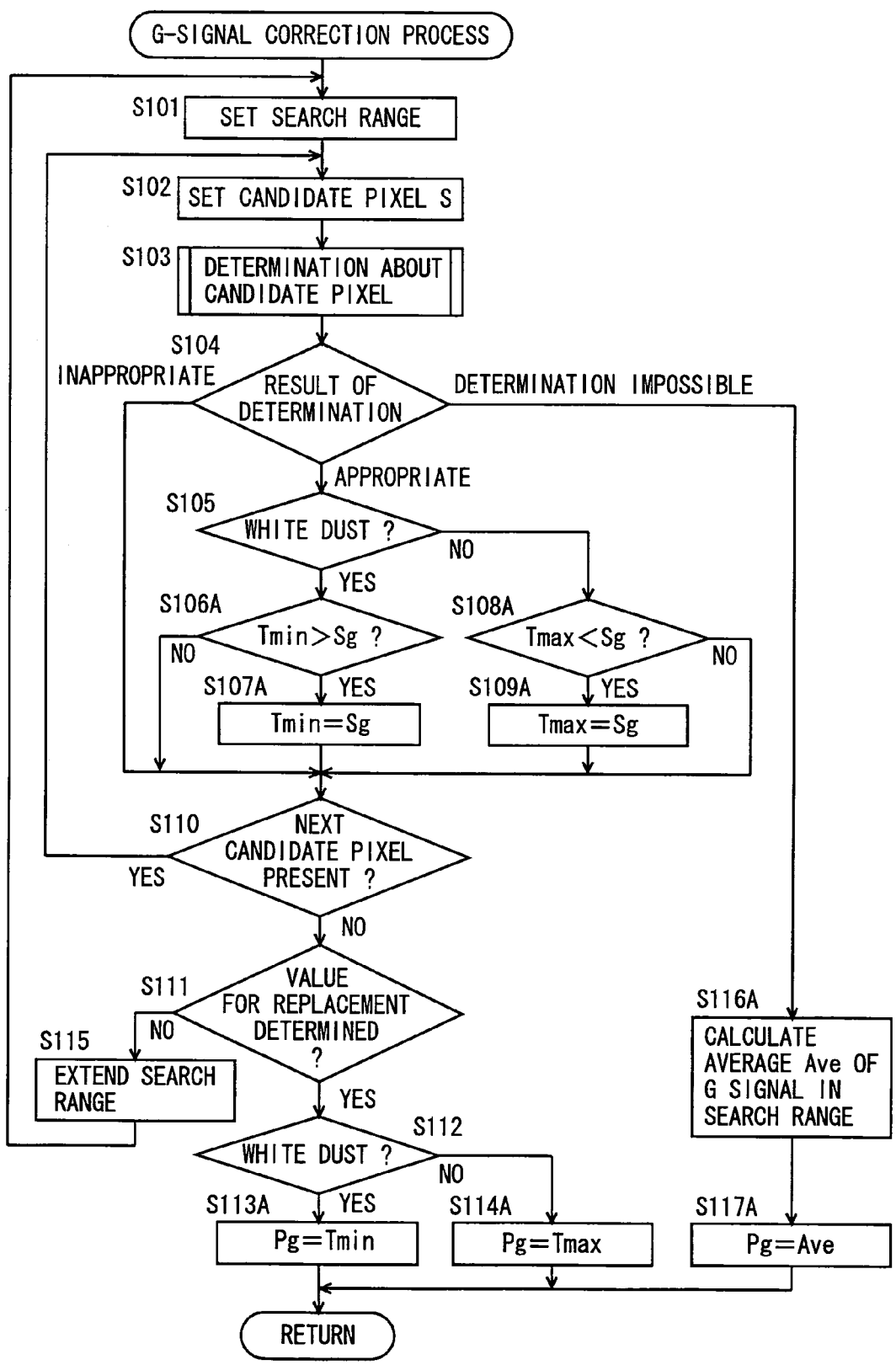
FIG. 17 is a flowchart showing a flow of a G-signal correction process in step S55 of FIG. 13.

FIG. 17 is a flowchart showing a flow of the G-signal correction process in step S55 of FIG. 13. In this flow of the G-signal correction process, any step different from the corresponding one of the R-signal correction process is indicated by a reference with letter "A" added thereto. In the following, steps different from those of the R-signal correction process are described.

In step S106A, it is determined whether or not value Sg of candidate pixel S of the G signal is smaller than variable Tmin. If so, the process proceeds to step S107A. If not, the process skips step S107A and proceeds to step S110. Variable Tmin is a variable for storing the minimum value of value Sg of candidate pixel S of the G signal, among pixels in the search range, for which the determination of appropriateness is made in step S103. Here, the initial value of variable Tmin is set to a value larger than the maximum value "255" of the pixel value.

In step S108A, it is determined whether or not value Sg of candidate pixel S of the G signal is larger than variable Tmax. If so, the process proceeds to step S109A. If not, the process skips step S109A and proceeds to step S110. Variable Tmax is a variable for storing the maximum value of value Sg of candidate pixel S of the G signal, among pixels in the search range, for which the determination as to appropriateness is made in step S103. Here, the initial value of variable Tmax is set to a value smaller than the minimum value "0" of the pixel value.

In step S116A, average value Ave of pixels in the search range of the G signal is calculated. Naturally, in calculating average value Ave, value Pg of target pixel P of the G signal is not used.

In step S113A, value Pg of target pixel P of the G signal is set to the value stored as variable Tmin that is a value for replacement of the white dust. In step S114A, value Pg of target pixel P of the G signal is set to the value stored as variable Tmax that is a value for replacement of the black dust. In step S117A, value Pg of target pixel P of the G signal is set to average Ave of the G signal in the search range. Then this process returns to the correction process.

Figure 18:
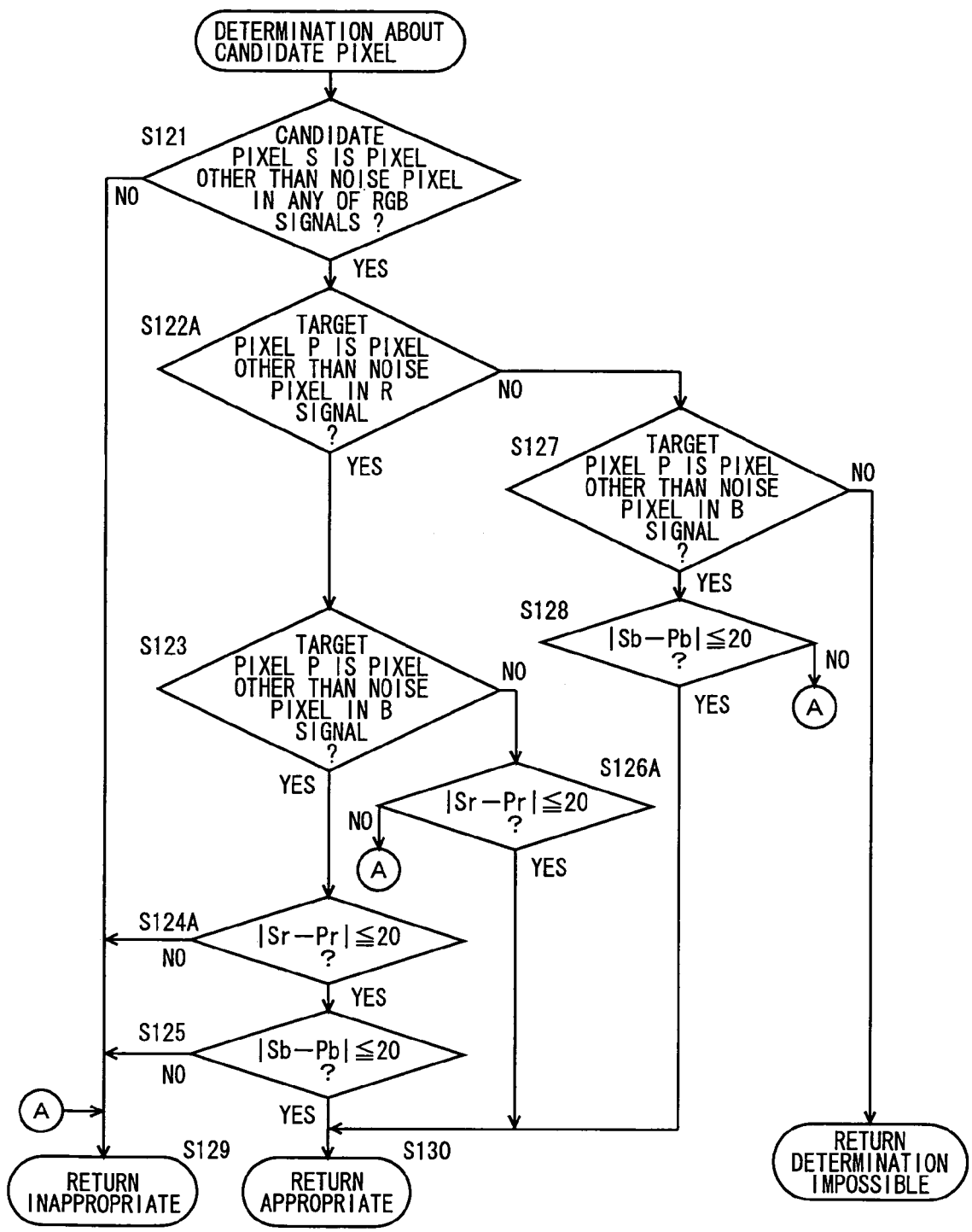
FIG. 18 is a flowchart showing a flow of a determination process for a candidate pixel in step S103 of FIG. 17.

FIG. 18 is a flowchart showing a flow of the determination process for the candidate pixel in step S103 of FIG. 17. In this flow, any step different from the corresponding one of the determination process in FIG. 16 is indicated by a reference with letter "A" added thereto. In the following, steps different from those of the determination process in FIG. 16 are chiefly described.

In step S122A, it is determined whether or not target pixel P is a pixel other than a noise pixel in the R signal. If so, the process proceeds to step S123. If not, the process proceeds to step S127.

The process proceeds to step S124A when the G signal of target pixel P is to be corrected and target pixel P is not a noise pixel in remaining two signals, i.e., R and B signals. The process proceeds to step S126A or S128 when the G signal of target pixel P is to be corrected and target pixel P is not a noise pixel in at least one of the remaining R and B signals. When the process proceeds to step S126A, target pixel P of the R signal is not a noise pixel. When the process proceeds to step S128, target pixel P of the B signal is not a noise pixel. When the process proceeds to step S131, target pixel P is a noise pixel in all of the R, G and B signals. In this case, the signal "determination impossible" indicating that the determination as to whether or not the candidate pixel is appropriate cannot be made is returned to the R-signal correction process, and the current process is ended.

In step S124A, using the fact that target pixel P of the R signal is not a noise pixel, it is determined whether or not the absolute value of the difference between value Sr of candidate pixel S of the R signal and value Pr of target pixel P of the R signal is equal to or smaller than 20. If so, the process proceeds to step S125. If not, the process proceeds to step S129. Thus, it is determined whether or not value Sr of candidate pixel S of the R signal is close to value Pr of target pixel P of the R signal. The threshold value is not limited to "20".

Through steps S124A and S125, candidate pixel S for correcting value Pg of target pixel P of the G signal that is a noise pixel is selected. Then, the signal "appropriate" indicating that candidate pixel S selected in step S130 is appropriate for correcting the target pixel is returned to the G-signal correction process and the current process is ended.

In step S126A, using the fact that target pixel P of the R signal is not a noise pixel, it is determined whether or not the absolute value of the difference between value Sr of candidate pixel S of the R signal and value Pr of target pixel P of the R signal is equal to or smaller than 20. If so, the process proceeds to step S130. If not, the process proceeds to step S129. Thus, it is determined whether or not value Sr of candidate pixel S of the R signal is close to value Pr of target pixel P of the R signal. The threshold value is not limited to "20".

Through step S126A or S128, candidate pixel S for correcting value Pg of target pixel P of the G signal that is a noise pixel is selected. Then, the signal "appropriate" indicating that candidate pixel S selected in step S130 is appropriate for correcting target pixel P is returned to the R-signal correction process and the current process is ended.

Figure 19:
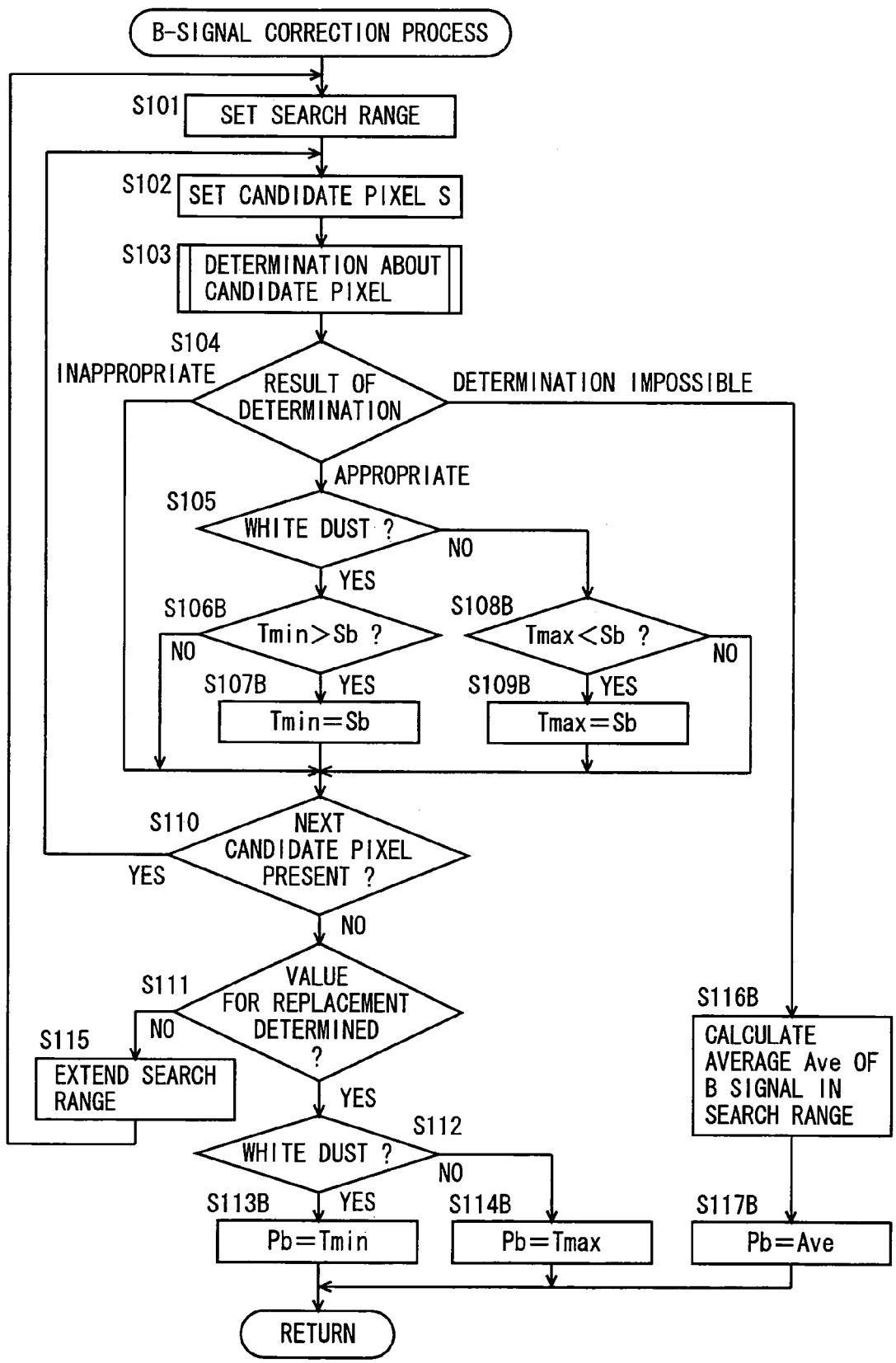
FIG. 19 is a flowchart showing a flow of a B-signal correction process in step S57 of FIG. 13.

FIG. 19 is a flowchart showing a flow of the B-signal correction process in step S57 of FIG. 13. In the flow of the B-signal correction process, any step different from the corresponding one of the R-signal correction process is indicated by a reference with letter "B" added thereto. In the following, steps of the B-signal correction process different from those of the R-signal correction process are described.

In step S106B, it is determined whether or not value Sb of candidate pixel S of the B signal is smaller than variable Tmin. If so, the process proceeds to step S107B. If not, the process skips step S107B and proceeds to step S110. Variable Tmin is a variable for storing the minimum value of value Sb of candidate pixel S of the B signal, among pixels in the search range, for which the determination of appropriateness is made in step S103. Here, the initial value of variable Tmin is set to a value larger than the maximum value "255" of the pixel value.

In step S108B, it is determined whether or not value Sb of candidate pixel S of the B signal is larger than variable Tmax. If so, the process proceeds to step S109B. If not, the process skips step S109B and proceeds to step S110. Variable Tmax is a variable for storing the maximum value of value Sb of candidate pixel S of the B signal, among pixels in the search range, for which the determination as to appropriateness is made in step S103. Here, the initial value of variable Tmax is set to a value smaller than the minimum value "0" of the pixel value.

In step S116B, average value Ave of pixels in the search range of the B signal is calculated. Naturally, in calculating average value Ave, value Pb of target pixel P of the B signal is not used.

In step S113B, value Pb of target pixel P of the B signal is set to the value stored as variable Tmin that is a value for replacement of the white dust. In step S114B, value Pb of target pixel P of the B signal is set to the value stored as variable Tmax that is a value for replacement of the black dust. In step S117B, value Pb of target pixel P of the B signal is set to calculated average value Ave of the B signal in the search range and the process returns to the correction process.

FIG. 20 is a flowchart showing a flow of the determination process for the candidate pixel in step S103 of FIG. 19. In this flow, any step different from the corresponding one of the determination process in FIG. 16 is indicated by a reference with letter "B" added thereto. In the following, steps different from those of the determination process in FIG. 16 are chiefly described.

In step S123B, it is determined whether or not target pixel P is a pixel other than a noise pixel in the R signal. If so, the process proceeds to step S124. If not, the process proceeds to step S126.

In step S127B, it is determined whether or not target pixel P is a pixel other than a noise pixel in the R signal. If so, the process proceeds to step S128B. If not, the process proceeds to step S131.

The process proceeds to step S124 when the B signal of target pixel P is to be corrected and target pixel P is not a noise pixel of remaining two signals, i.e., R and G signals. The process proceeds to step S126 or S128B when the B signal of target pixel P is to be corrected and target pixel P is not a noise pixel in at least one of the remaining R and G signals. When the process proceeds to step S126, target pixel P of the G signal is not a noise pixel. When the process proceeds to step S128B, target pixel P of the R signal is not a noise pixel. When the process proceeds to step S131, target pixel P is a noise pixel in all of the R, G and B signals. In this case, the signal "determination impossible" indicating that the determination as to whether or not the candidate pixel is appropriate cannot be made is returned to the R-signal correction process, and the current process is ended.

In step S125B, using the fact that target pixel P of the R signal is not a noise pixel, it is determined whether or not the absolute value of the difference between value Sr of candidate pixel S of the R signal and value Pr of target pixel P of the R signal is equal to or smaller than 20. If so, the process proceeds to step S130. If not, the process proceeds to step S129. Thus, it is determined whether or not value Sr of candidate pixel S of the R signal is close to value Pr of target pixel P of the R signal. The threshold value is not limited to "20".

Through steps S124 and S125B, candidate pixel S for correcting value Pb of target pixel P of the B signal that is a noise pixel is selected. Then, the signal "appropriate" indicating that candidate pixel S selected in step S130 is appropriate for correcting the target pixel is returned to the B-signal correction process and the current process is ended.

In step S128B, using the fact that target pixel P of the R signal is not a noise pixel, it is determined whether or not the absolute value of the difference between value Sr of candidate pixel S of the R signal and value Pr of target pixel P of the R signal is equal to or smaller than 20. If so, the process proceeds to step S130. If not, the process proceeds to step S129. Thus, it is determined whether or not value Sr of candidate pixel S of the R signal is close to value Pr of target pixel P of the R signal. The threshold value is not limited to "20".

Through step S126 or S128B, candidate pixel S for correcting value Pb of target pixel P of the B signal that is a noise pixel is selected. Then, the signal "appropriate" indicating that candidate pixel S selected in step S130 is appropriate for correcting the target pixel is returned to the R-signal correction process and the current process is ended.

As heretofore discussed, image reading apparatus 10 in the present embodiment selects a candidate pixel used for correcting a noise pixel from pixels of a signal different from the signal with the noise pixel. In other words, the candidate pixel is determined based on pixels of other data reading the same location of the original as the noise pixel. Thus, noise resultant from reading dust is corrected with a pixel selected from neighboring pixels, and accordingly the image quality after the correction can be improved.

Note that while the present embodiment has been described with reader 213 fixed to main body 103 by way of example, alternatively, the present invention is also applicable to moving reader 213 for scanning. For example, the upper restraint plate is of monochromatic color of white or black, and reader 213 or the source of light 206, reflector mirror 209 and reflector member 208 are moved in the sub scanning direction for scanning. During the scan, platen 205 can be oscillated in the sub scanning direction to detect dust adhering on platen 205.

Further note that while the search range extends in the main scanning direction with the target pixel at the center, the search range may extend in the direction crossing the main scanning direction. Alternatively, a plurality of search ranges extending in different directions may be prepared and a search range may be selected therefrom that extends in the direction in which edge pixels in the neighboring region of the target pixel are arranged.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus comprising:
   a plurality of line sensors arranged to be mutually spaced in a sub scanning direction to scan an original in the sub scanning direction, wherein signals of the plurality of line sensors are composited together by the image reading apparatus to generate an image corresponding to the original;
   a platen arranged between the original and said plurality of line sensors;
   a mover moving said platen at a rate relative to said plurality of line sensors, said rate being different from that of the original relative to said plurality of line sensors;
   an extractor extracting from data from a first line sensor of said plurality of line sensors a feature pixel having a predetermined feature;
   a detector comparing pixels from data of said plurality of line sensors corresponding to a single location on the original to one another to identify the feature pixel as a noise pixel if the feature pixel is detected at said single location and no other feature pixel extracted from data of said plurality of line sensors other than said first line sensor data is detected at said single location;
   a second pixel extractor extracting, based on a value of a first pixel present in data from a second line sensor of said plurality of line sensors and corresponding to the same location on the original as said noise pixel, a second pixel present in data from said first line sensor for correcting said noise pixel; and
   a corrector correcting said noise pixel based on said extracted second pixel.

2. The image reading apparatus according to claim 1, further comprising an interline corrector synchronizing data output by said plurality of line sensors to be values of pixels reading a single location on the original, wherein data synchronized by said interline corrector are input, one line at a time, sequentially.

3. The image reading apparatus according to claim 1, wherein said second pixel extractor includes a third pixel extractor extracting a third pixel present in data from said second line sensor, having its value within a predetermined range relative to the value of said first pixel and located in the vicinity of said first pixel, and said second pixel extractor extracts, as said second pixel, a pixel that is present in data from said first line sensor, corresponding to the same location on the original as said third pixel, and is not detected as a noise pixel by said detector.

4. The image reading apparatus according to claim 3, wherein said second pixel extractor extracts said third pixel from a pixel group selected from a plurality of pixel groups each including a plurality of pixels arranged in a predetermined direction, and said plurality of pixel groups are different from each other in direction in which said plurality of pixels are arranged.

5. The image reading apparatus according to claim 4, wherein said second pixel extractor includes a selector selecting one of said plurality of pixel groups according to a direction in which edge pixels around said noise pixel are arranged.

6. The image reading apparatus according to claim 3, wherein said third pixel extractor extracts said third pixel from a first pixel group including pixels neighboring said first pixel in a first direction.

7. The image reading apparatus according to claim 6, wherein said first direction is a main scanning direction substantially orthogonal to the sub scanning direction.

8. The image reading apparatus according to claim 3, wherein said third pixel extractor extracts said third pixel from a second pixel group larger in the sub scanning direction than a first pixel group including pixels neighboring said first pixel in a first direction, when said third pixel is not extracted from said first pixel group.

9. The image reading apparatus according to claim 1, wherein said corrector replaces a value of said noise pixel with a value of said second pixel.

10. The image reading apparatus according to claim 1, wherein said corrector replaces, when said second pixel extractor extracts a plurality of second pixels, a value of said noise pixel with a minimum or maximum value of said plurality of second pixels based on the value of said noise pixel.

11. The image reading apparatus according to claim 10, wherein said corrector replaces, when said noise pixel is high in value, the value of said noise pixel with the maximum value of said plurality of second pixels.

12. The image reading apparatus according to claim 10, wherein said corrector replaces, when said noise pixel is low in value, the value of said noise pixel with the minimum value of said plurality of second pixels.

13. The image reading apparatus according to claim 1, wherein said detector includes an order determination unit determining the order in which noise pixels are detected from data of said first line sensor, and a noise pixel corrector correcting a second feature pixel extracted from data of said first line sensor to a second noise pixel if the noise pixel is detected on a line directly preceding the second feature pixel.

14. The image reading apparatus according to claim 13, wherein the first pixel that is not a noise pixel.

15. The image reading apparatus according to claim 13, wherein said corrector corrects said noise pixel, when said first pixel is not a noise pixel, using an average of respective values of pixels within a predetermined range relative to said noise pixel.

16. The image reading apparatus according to claim 1, wherein said extractor includes an edge extractor extracting an edge region and extracts as said feature pixel a pixel included in the extracted edge region.

17. The image reading apparatus according to claim 1, wherein said extractor includes a region extractor extracting a region having a limited variation in lightness and a difference from a neighboring region in lightness of at least a predetermined value, and extracts as said feature pixel a pixel included in said extracted region.

18. The image reading apparatus according to claim 1, wherein said detector includes an extender setting, for each of the other feature pixels extracted from data of the plurality of line sensors other than said first line sensor, a pixel neighboring said other feature pixel as an extended feature pixel, the noise pixel detector detecting said feature pixel corresponding to said single location extracted from data of the first line sensor as a noise pixel if no extended feature pixel is detected at said single location.

19. The image reading apparatus according to claim 1, wherein said plurality of line sensors each include a filter different in spectral sensitivity to receive light reflected from the original through the filter.

20. The image reading apparatus according to claim 1, further comprising an original transporter transporting the original while said plurality of line sensors scan the original.

* * * * *